(12) United States Patent
Reid et al.

(10) Patent No.: US 11,543,831 B2
(45) Date of Patent: Jan. 3, 2023

(54) TERRAIN TRAFFICABILITY ASSESSMENT FOR AUTONOMOUS OR SEMI-AUTONOMOUS ROVER OR VEHICLE

(71) Applicant: Mission Control Space Services Inc., Ottawa (CA)

(72) Inventors: Ewan Reid, Ottawa (CA); Michele Faragalli, Ottawa (CA)

(73) Assignee: Mission Control Space Services Inc., Ottawa (CA)

( * ) Notice: Subject to any disclaimer, the term of this patent is extended or adjusted under 35 U.S.C. 154(b) by 218 days.

(21) Appl. No.: 16/818,578

(22) Filed: Mar. 13, 2020

(65) Prior Publication Data
US 2020/0293057 A1 Sep. 17, 2020

Related U.S. Application Data

(60) Provisional application No. 62/818,881, filed on Mar. 15, 2019.

(51) Int. Cl.
| | |
|---|---|
| *G05D 1/02* | (2020.01) |
| *G06N 20/00* | (2019.01) |
| *G06N 3/08* | (2006.01) |
| *B60W 60/00* | (2020.01) |
| *G06K 9/62* | (2022.01) |
| *G05D 1/00* | (2006.01) |
| *G06V 10/22* | (2022.01) |
| *G06V 20/56* | (2022.01) |

(52) U.S. Cl.
CPC ......... *G05D 1/0246* (2013.01); *B60W 60/001* (2020.02); *G05D 1/0088* (2013.01); *G05D 1/0214* (2013.01); *G06K 9/6268* (2013.01); *G06N 3/08* (2013.01); *G06N 20/00* (2019.01); *G06V 10/22* (2022.01); *G06V 20/56* (2022.01); *B60W 2420/42* (2013.01); *B60W 2552/15* (2020.02); *B60W 2556/50* (2020.02)

(58) Field of Classification Search
CPC .. G05D 1/0246; G05D 1/0088; G05D 1/0214; G05D 2201/0218; G05D 1/0221; G05D 1/0251; B60W 60/001; B60W 2552/15; B60W 2420/42; B60W 2556/50; B60W 2552/20; B60W 2552/40; G06K 9/6268; G06N 3/08; G06V 10/22; G06V 20/56
See application file for complete search history.

(56) References Cited

U.S. PATENT DOCUMENTS

| | | | |
|---|---|---|---|
| 9,376,108 B2 * | 6/2016 | Fairgrieve | B60W 10/12 |
| 9,965,868 B2 * | 5/2018 | Liu | G06T 7/13 |
| 2014/0257621 A1 * | 9/2014 | Zych | G01C 21/20 |
| | | | 701/410 |
| 2020/0094843 A1 * | 3/2020 | Bärecke | B60W 40/068 |

* cited by examiner

*Primary Examiner* — Thomas Ingram
(74) *Attorney, Agent, or Firm* — Byrne Poh LLP

(57) ABSTRACT

A rover or semi-autonomous or autonomous vehicle may use an image classifier to determine a terrain class of regions of an image of the terrain ahead of the rover or vehicle. The regions of the images are used to estimate the slope of the terrain for the different regions. The terrain class and slope are used to predict an amount of slip the rover will experience when traversing the terrain of the different regions. A heuristic mapping for the terrain class may be applied to the predicted slip amount to determine a hazard level for the rover or vehicle traversing the terrain.

20 Claims, 15 Drawing Sheets

TERRAIN TRAFFICABILITY ASSESSMENT FOR AUTONOMOUS OR SEMI-AUTONOMOUS ROVER OR VEHICLE

CROSS REFERENCE TO RELATED APPLICATIONS

The present application claims the benefit of U.S. Provisional Patent Application No. 62/818,881 filed Mar. 15, 2019, and claims the benefit of a Canadian Patent Application entitled "TERRAIN TRAFICABILITY ASSESMENT FOR AUTONOMOUS OR SEMI-AUTONOMOUS ROVER OR VEHICLE," filed on Mar. 11, 2020 (Inventors: Ewan Reid and Michele Faragalli; each of which is hereby incorporated by reference herein in its entirety.

TECHNICAL FIELD

The current disclosure relates to navigation for autonomous or semi-autonomous rovers or vehicles and in particular to assessing trafficability of terrain.

BACKGROUND

Planetary rovers are autonomous or semi-autonomous vehicles that may be used to explore other planets. Planning routes for the rover to traverse requires careful planning in order to avoid traversing terrain that the rover may get stuck in. The communication delay between rovers and earth may make planning, revising, or updating routes based on actual terrain conditions time consuming. Rovers, or more broadly autonomous or semi-autonomous vehicles, may also be used in traversing a wide range of terrain on earth. When traversing unknown terrain, careful route planning is needed to ensure the rover or vehicle does not get stuck.

Route planning may use terrain classification or characterisation techniques in order to attempt to determine how safe or unsafe particular terrain is to traverse. While terrain classification is helpful in route planning, it is desirable to have an additional, alternative and/or improved route planning techniques.

BRIEF DESCRIPTION OF THE DRAWINGS

Features, aspects and advantages of the present disclosure will become better understood with regard to the following description and accompanying drawings in which.

DETAILED DESCRIPTION

Figure 1:
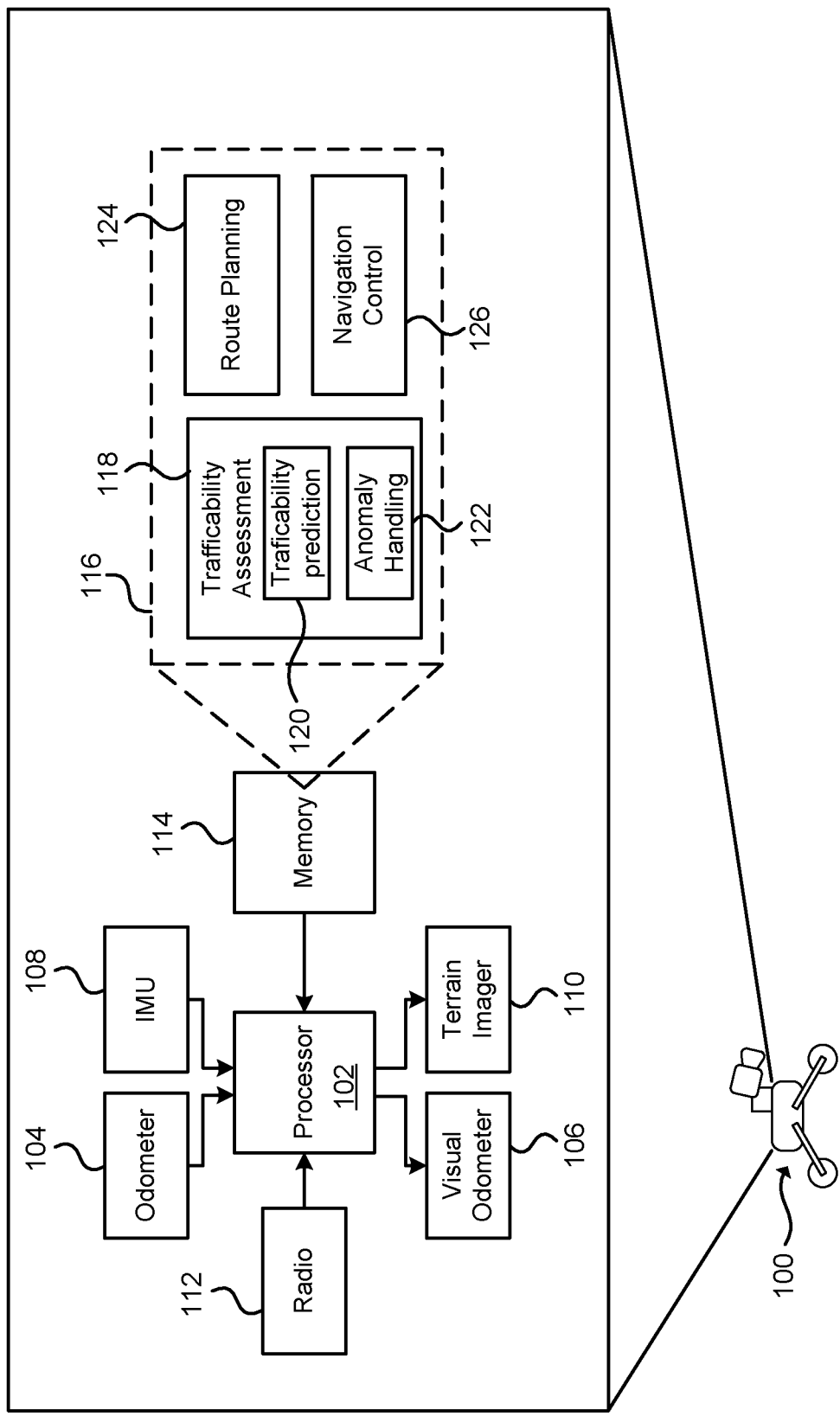
FIG. 1 depicts components of a rover with terrain trafficability assessment functionality.

In accordance with the present disclosure there is provided a method for use in navigating an autonomous or semi-autonomous vehicle, the method implemented by the vehicle and comprising: receiving image data of at least one image of terrain ahead of the vehicle captured using a terrain imaging unit capable of capturing images of terrain ahead of the vehicle; determining a terrain class of a region of the terrain from the received image data; selecting a slip prediction model models based on the determined terrain class, the slip prediction model selected from a plurality of trained slip prediction models; estimating a slope of the region of the terrain from the image data; predicting a slip amount based on the estimated slope using the selected trained slip model; applying a heuristic mapping to the predicted slip amount to provide a trafficability level, from a plurality of trafficability levels, for the region of the terrain; and outputting an indication of the trafficability level for use in determining a route for the vehicle.

In a further embodiment, the method further comprises: measuring an actual slip amount when traversing the region of the terrain; comparing the actual slip amount to the predicted slip amount; and if the actual slip amount differs from the predicted slip amount by a first anomalous threshold range, adjusting the heuristic mapping to account for the anomalous slip.

In a further embodiment, the method further comprises if the actual slip amount differs from the predicted slip amount by a second anomalous threshold range greater than the first threshold range, halting navigation of the vehicle.

In a further embodiment, the method further comprises flagging data comprising one or more captured images and measured slip and slope values; transmitting the flagged data to a remote control location for manual review; receiving update data from the remote control location in response to the transmitted flagged data; and updating one or more terrain classifiers and trained slip models.

In a further embodiment, the method further comprises subsequent to updating the one or more terrain classifiers and trained slip models, if the vehicle navigation has been halted, resuming the vehicle navigation.

In a further embodiment, the method further comprises if actual slip amount differs from the predicted slip amount by less than the first anomalous threshold range, determining if the actual slip amount should be used to update the selected trained slip prediction model; and when it is determined that the selected trained slip prediction model should be updated, updating the selected trained slip prediction model using the actual slip amount and a measured slope of the region of the terrain.

In a further embodiment of the method, the heuristic mapping applied to the predicted slip amount is associated with the determined terrain class of the region of terrain.

In a further embodiment of the method, the heuristic mapping maps predicted slip amounts to one of a plurality of predefined trafficability levels.

In a further embodiment, the method further comprises operating in a training mode at a first location by capturing slip and slope experienced by the vehicle while traversing terrain of a known terrain type; and storing a model of the slip and slope in association with the known terrain type.

In a further embodiment of the method, the slope is binned into predetermined bin ranges.

In a further embodiment, the method further comprises while operating in a training more, capturing images of terrain with each of the plurality of known terrain types; and training an image classifier to determine the terrain type from images of terrain.

In a further embodiment of the method, the capturing of images in the training mode is performed at the first location.

In a further embodiment of the method, the capturing of images in the training mode is performed at a second location where the region of the terrain is located.

In a further embodiment, the method further comprises determining an interest level of one or more regions of the terrain from the image data for use in determining the route of the vehicle.

In accordance with the present disclosure there is further provided a non-transitory computer readable memory storing instructions which when executed provide a method for use in navigating an autonomous or semi-autonomous vehicle, the method comprising: receiving image data of at least one image of terrain ahead of the vehicle captured using a terrain imaging unit capable of capturing images of terrain ahead of the vehicle; determining a terrain class of a region of the terrain from the received image data; selecting a slip prediction model models based on the determined terrain class, the slip prediction model selected from a plurality of trained slip prediction models; estimating a slope of the region of the terrain from the image data; predicting a slip amount based on the estimated slope using the selected trained slip model; applying a heuristic mapping to the predicted slip amount to provide a trafficability level, from a plurality of trafficability levels, for the region of the terrain; and outputting an indication of the trafficability level for use in determining a route for the vehicle.

In a further embodiment of the non-transitory computer readable memory, the method further comprises: measuring an actual slip amount when traversing the region of the terrain; comparing the actual slip amount to the predicted slip amount; and if the actual slip amount differs from the predicted slip amount by a first anomalous threshold range, adjusting the heuristic mapping to account for the anomalous slip.

In a further embodiment of the non-transitory computer readable memory, the method further comprises: if the actual slip amount differs from the predicted slip amount by a second anomalous threshold range greater than the first threshold range, halting navigation of the vehicle.

In a further embodiment of the non-transitory computer readable memory, the method further comprises: flagging data comprising one or more captured images and measured slip and slope values; transmitting the flagged data to a remote control location for manual review; receiving update data from the remote control location in response to the transmitted flagged data; and updating one or more terrain classifiers and trained slip models.

In a further embodiment of the non-transitory computer readable memory, the method further comprises: subsequent to updating the one or more terrain classifiers and trained slip models, if the vehicle navigation has been halted, resuming the vehicle navigation.

In a further embodiment of the non-transitory computer readable memory, the method further comprises: if actual slip amount differs from the predicted slip amount by less than the first anomalous threshold range, determining if the actual slip amount should be used to update the selected trained slip prediction model; and when it is determined that the selected trained slip prediction model should be updated, updating the selected trained slip prediction model using the actual slip amount and a measured slope of the region of the terrain.

In a further embodiment of the non-transitory computer readable memory, the heuristic mapping applied to the predicted slip amount is associated with the determined terrain class of the region of terrain.

In a further embodiment of the non-transitory computer readable memory, the heuristic mapping maps predicted slip amounts to one of a plurality of predefined trafficability levels.

In a further embodiment of the non-transitory computer readable memory, the method further comprises: operating in a training mode at a first location by capturing slip and slope experienced by the vehicle while traversing terrain of a known terrain type; and storing a model of the slip and slope in association with the known terrain type.

In a further embodiment of the non-transitory computer readable memory, the slope is binned into predetermined bin ranges.

In a further embodiment of the non-transitory computer readable memory, the method further comprises: while operating in a training more, capturing images of terrain with each of the plurality of known terrain types; and training an image classifier to determine the terrain type from images of terrain.

In a further embodiment of the non-transitory computer readable memory, the capturing of images in the training mode is performed at the first location.

In a further embodiment of the non-transitory computer readable memory, the capturing of images in the training mode is performed at a second location where the region of the terrain is located.

In a further embodiment of the non-transitory computer readable memory, the method further comprises determining an interest level of one or more regions of the terrain from the image data for use in determining the route of the vehicle.

In accordance with the present disclosure there is further provided an autonomous or semi-autonomous vehicle comprising: a terrain imaging unit for capturing images of terrain ahead of the vehicle; a processing unit for executing instructions; and a memory storing instructions, which when executed by the processing unit configure the vehicle to: receive image data of at least one image of terrain ahead of the vehicle captured using a terrain imaging unit capable of capturing images of terrain ahead of the vehicle; determine a terrain class of a region of the terrain from the received image data; select a slip prediction model models based on the determined terrain class, the slip prediction model selected from a plurality of trained slip prediction models; estimate a slope of the region of the terrain from the image data; predict a slip amount based on the estimated slope using the selected trained slip model; apply a heuristic mapping to the predicted slip amount to provide a trafficability level, from a plurality of trafficability levels, for the region of the terrain; and output an indication of the trafficability level for use in determining a route for the vehicle.

In a further embodiment of autonomous or semi-autonomous vehicle, the instructions stored in memory, which when executed, further configure the vehicle to: measure an actual slip amount when traversing the region of the terrain; compare the actual slip amount to the predicted slip amount; and if the actual slip amount differs from the predicted slip amount by a first anomalous threshold range, adjust the heuristic mapping to account for the anomalous slip.

In a further embodiment of autonomous or semi-autonomous vehicle, the instructions stored in memory, which when executed, further configure the vehicle to: if the actual slip amount differs from the predicted slip amount by a second anomalous threshold range greater than the first threshold range, halt navigation of the vehicle.

In a further embodiment of autonomous or semi-autonomous vehicle, the instructions stored in memory, which when executed, further configure the vehicle to: flag data comprising one or more captured images and measured slip and slope values; transmit the flagged data to a remote control location for manual review; receive update data from the remote control location in response to the transmitted flagged data; and update one or more terrain classifiers and trained slip models.

In a further embodiment of autonomous or semi-autonomous vehicle, the instructions stored in memory, which when executed, further configure the vehicle to: subsequent to updating the one or more terrain classifiers and trained slip models, if the vehicle navigation has been halted, resume the vehicle navigation.

In a further embodiment of autonomous or semi-autonomous vehicle, the instructions stored in memory, which when executed, further configure the vehicle to: if actual slip amount differs from the predicted slip amount by less than the first anomalous threshold range, determine if the actual slip amount should be used to update the selected trained slip prediction model; and when it is determined that the selected trained slip prediction model should be updated, update the selected trained slip prediction model using the actual slip amount and a measured slope of the region of the terrain.

In a further embodiment of autonomous or semi-autonomous vehicle, the heuristic mapping applied to the predicted slip amount is associated with the determined terrain class of the region of terrain.

In a further embodiment of autonomous or semi-autonomous vehicle, the heuristic mapping maps predicted slip amounts to one of a plurality of predefined trafficability levels.

In a further embodiment of autonomous or semi-autonomous vehicle, the instructions stored in memory, which when executed, further configure the vehicle to: operate in a training mode at a first location by capturing slip and slope experienced by the vehicle while traversing terrain of a known terrain type; and store a model of the slip and slope in association with the known terrain type.

In a further embodiment of autonomous or semi-autonomous vehicle, the slope is binned into predetermined bin ranges.

In a further embodiment of autonomous or semi-autonomous vehicle, the instructions stored in memory, which when executed, further configure the vehicle to: while operating in a training more, capture images of terrain with each of the plurality of known terrain types; and train an image classifier to determine the terrain type from images of terrain.

In a further embodiment of autonomous or semi-autonomous vehicle, the capturing of images in the training mode is performed at the first location.

In a further embodiment of autonomous or semi-autonomous vehicle, the capturing of images in the training mode is performed at a second location where the region of the terrain is located.

In a further embodiment of autonomous or semi-autonomous vehicle, the instructions stored in memory, which when executed, further configure the vehicle to determine an interest level of one or more regions of the terrain from the image data for use in determining the route of the vehicle.

Current rover navigation algorithms rely primarily on the detection and avoidance of geometric hazards such as rocks and steep slopes. Terrain classification techniques can be useful in identifying "terrain induced hazards" or "non-geometric hazards" that can pose severe mobility challenges to a rover. Non-geometric hazards are highly dependent on wheel-terrain interaction properties. A rover may be trained during a training phase to evaluate terrain induced hazards in order to avoid traversing hazardous terrain. During an operational phase, the trained models are used to predict hazard levels of the terrain that may be traversed. The terrain used in training the rover may or may not look and behave the same as the terrain encountered during the operational phase, and as such it would be desirable to continue training the rover based on the encountered terrain. The rover includes functionality for determining if the encountered terrain acts anomalously compared to the trained models. When the model predictions and actual terrain compare favorably to each other, the models may be updated based on the encountered terrain. However, when there is an anomaly between the model predictions and encountered terrain, the rover may either adjust predicted hazard levels and continue the rover navigation, or may stop the rover navigation while the anomalous results are reviewed. Accordingly, the rover may continue to operate even if anomalous behavior is detected and only halted if the anomalous predictions exceed a threshold range indicating that the models are not providing acceptable predictions.

FIG. 1 depicts components of a rover with trafficability assessment functionality. The rover 100 is described with particular reference to planetary rovers that may be used to explore surfaces of other planets or celestial bodies. During an operational phase, the rovers operate in an autonomous or semi-autonomous manner. For example, the general route between a start point and destination may be determined manually, however the precise route, including possible obstacle avoidances, may be determined automatically. Due to the potential inability to timely receive communications from the rover, it is desirable that the rover is able to act autonomously as much as possible. Although described with reference to planetary rovers, the same techniques may be used with rovers, or other autonomous or semi-autonomous vehicles used to explore or travel over off-road, unknown terrain on earth.

The rover 100 of FIG. 1 depicts various components with regard to the trafficability assessment functionality 118. Other components of the rover 100, such as mechanical systems, scientific sensors, etc., are not discussed in detail herein. Based on the description herein, it would be clear how to incorporate the trafficability assessment functionality into rovers with various different drive systems, control systems, sensor systems etc.

The rover 100 comprises a processor 102, which may include one or more processing units, processors, microprocessors, etc., that executes instructions that configure the rover to provide various functionality as described further below. The processor 102 may be operatively coupled to a plurality of different components including, for example an odometer 104 capable of tracking or determining an amount of distance covered by the rover. The odometer 104 measures the movement of the wheel(s) or drivetrain and due to slipping may not provide the actual distance traveled. The rover 100 further includes a visual odometer 106 that is capable of determining an actual distance travelled by the rover. The visual odometer may comprise one or more cameras or imaging devices that allow the actual distance travelled to be determined by processing the captured images or data to identify common features in subsequently captured images and determine a distance between the common features in images. By comparing the distances from the odometer 104 and the visual odometer 106 it is possible to determine an amount of wheel, or drive train slip. An inertial measurement unit (IMU) 108 may provide information about the rover's orientation, rotational rates and linear accelerations. A terrain imager 110 captures images of the terrain ahead of the rover, or in the direction the rover is attempting to travel. The terrain imager 110 may comprise a pair of cameras providing stereoscopic images of the terrain. The rover may further comprise one or more communication radios 112 for communicating with a remote system. Depending upon where the rover is deployed during the operational phase, various different types of communication radios may be employed. Regardless of the particular details of the communication radio, it allows the rover to send data to, and receive data from, a remote location. Depending upon where the rover is deployed there may or may not be a communication delay between when data is sent from the rover and received at the remote location. The rover 100 further comprises a memory 114 storing data and instructions, which when executed by the processor 102 configure the rover 100 to provide various functionality 116.

The functionality 116 may include trafficability assessment functionality 118. As described further below, the trafficability assessment functionality 118 evaluates terrain the rover may traverse and provides hazard levels for different regions of the terrain. The trafficability assessment functionality 118 may comprise trafficability prediction functionality 120 for determining the hazard levels of different regions of the terrain based on captured images. Additionally, the trafficability assessment functionality 118 may include anomaly handling functionality 122 that can detect when anomalous behaviour of the rover, relative to the predicted trafficability, occurs and take appropriate action. Depending upon the severity of the anomaly, the anomaly handling functionality 122 may adjust heuristic mappings used in determining hazard levels in order to make the hazard level prediction more conservative. When adjusting the hazard level mappings, the rover may continue to navigate the terrain. If the anomaly is more severe, the anomaly handling functionality may stop the navigation of the rover and send data to the remote location for evaluation and possible manual refining of models used by the rover, which may then be updated. If the anomaly handling functionality 122 does not detect any anomalous behaviour, the rover may update the models automatically using captured data.

The trafficability assessment functionality 118 provides hazard levels for the rover to traverse different regions of the terrain. Based on the hazard levels, route planning functionality 124 may determine a route for the rover to take. The route planning functionality may further incorporate other route planning functionality such as obstacle avoidance techniques. Navigation control functionality 126 may control the rover in order to traverse the planned route.

The trafficability assessment functionality 118, and in particular the trafficability prediction functionality 120 may operate in two main phases. The first is a training phase where the rover is driven over various different types of terrain. The rover captures images of the terrain being driven over as well as sensor data of the rover and uses the captured data to train both image classifiers as well as trafficability models. The terrain the rover traverses during the training stage may be selected to have similar characteristics to the terrain the rover will encounter during the operational phase. Further, while it is undesirable to have the rover become stuck during the operational phase, during training the rover may be purposefully driven until stuck on different terrain types in order to collect associated sensor data. Since the training phase would be overseen by humans, once the rover becomes stuck, it can be freed and training continued. Once trained, the rover may be deployed to an operational environment, either on other regions on earth or other celestial bodies. During the operation phase the trained models are used to predict, from captured images, whether the terrain ahead of the rover may safely be traversed. The information is used to plan a safe route for the rover to travel. During the operational phase, the models may be continuously trained with updated data of terrain images and sensor data. During the operational phase, the rover may be in a remote location and may be impossible for individuals to intervene if the rover becomes stuck. Accordingly, the rover detects anomalies, or possible anomalies, between predicted behaviour and actual detected behaviour and if the anomaly is severe, all navigation of the rover may be halted and the collected data sent back to a central remote location for further analysis and manual adjustments to the trained models. If a detected anomaly is not severe, the rover may continue navigating, however the mappings used to determine the hazard levels of the terrain may be adjusted to be more conservative.

Figure 2:
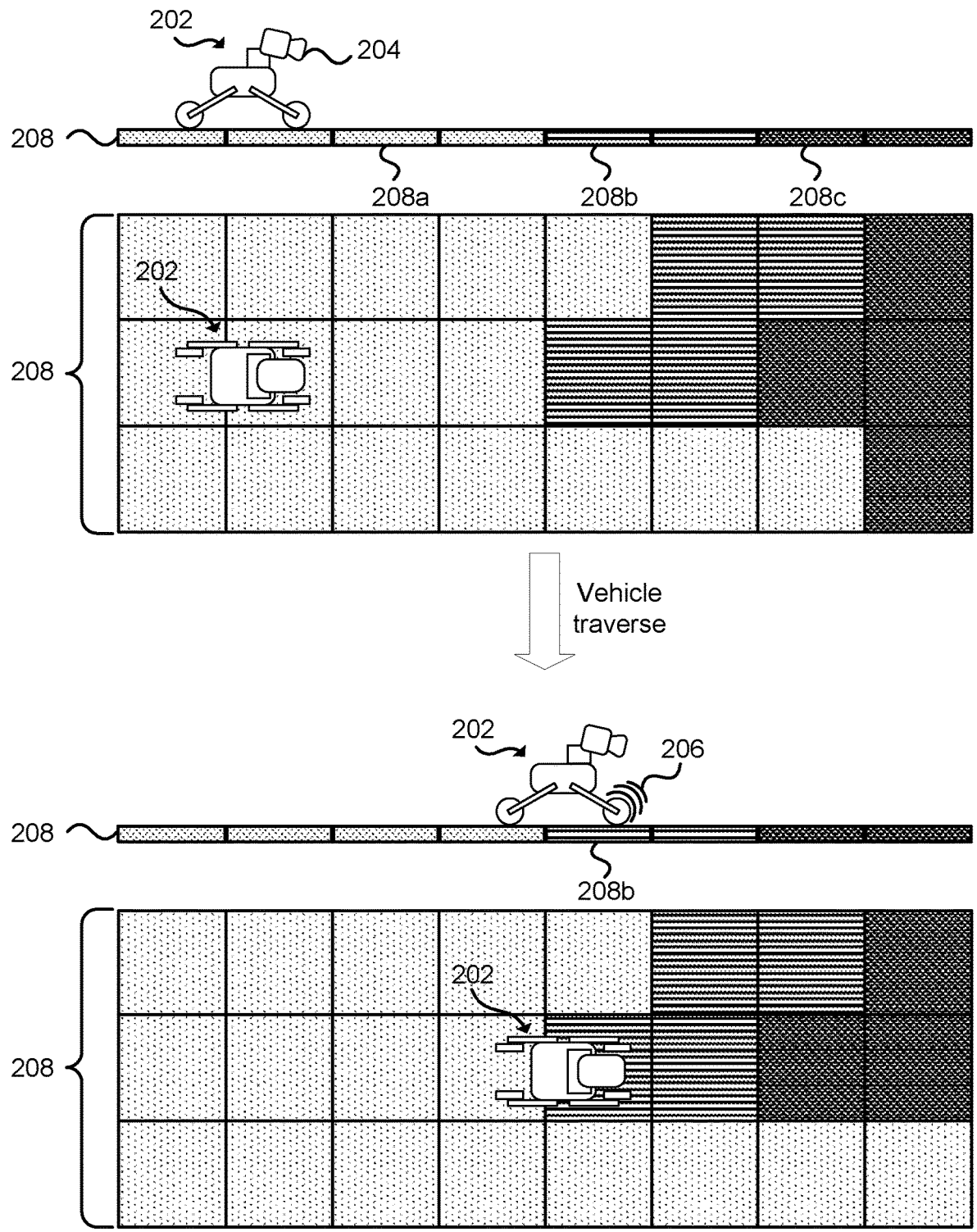
FIG. 2 depicts training of the terrain trafficability assessment functionality.

FIG. 2 depicts training of a terrain terramechanics model. As depicted in FIG. 2, a rover 202 drives over various different types of terrain, depicted as different shaded regions 208a, 208b, 208c and referred to collectively as terrain 208. The different terrain types represent terrain that may have different physical characteristics, such as sand, gravel, rock, etc. Although three different types of terrain are depicted, more terrain types may be used. It is noted that in FIG. 2 the different types of terrain are depicted as being flat for clarity. In practice, during the training phase, the rover will be driven over different terrain types with different slopes. The rover may be driven over a wide range of terrain to collect data on when, or at what slope, the rover begins to slip on the particular terrain type. During the training phase, the rover uses the terrain imaging camera 204, which may be stereoscopic camera, to capture images of the terrain ahead of it. The terrain type that the rover traverses is known and used along with the captured images of the terrain in training terrain classifiers that, once trained, can classify the terrain type based on images. As the vehicle traverses the different regions that have been classified, the rover captures sensor data, depicted graphically as arcs 206 for the rover on the particular terrain type. The captured sensor data is then used to train a trafficability model for the terrain type. The sensor data may comprise slope information provided by the rover's IMU sensor as well as slip information provided by comparing the odometer reading to the visual odometer. The training of the terrain classifiers and trafficability models is described further below with reference to FIG. 4.

Figure 3:
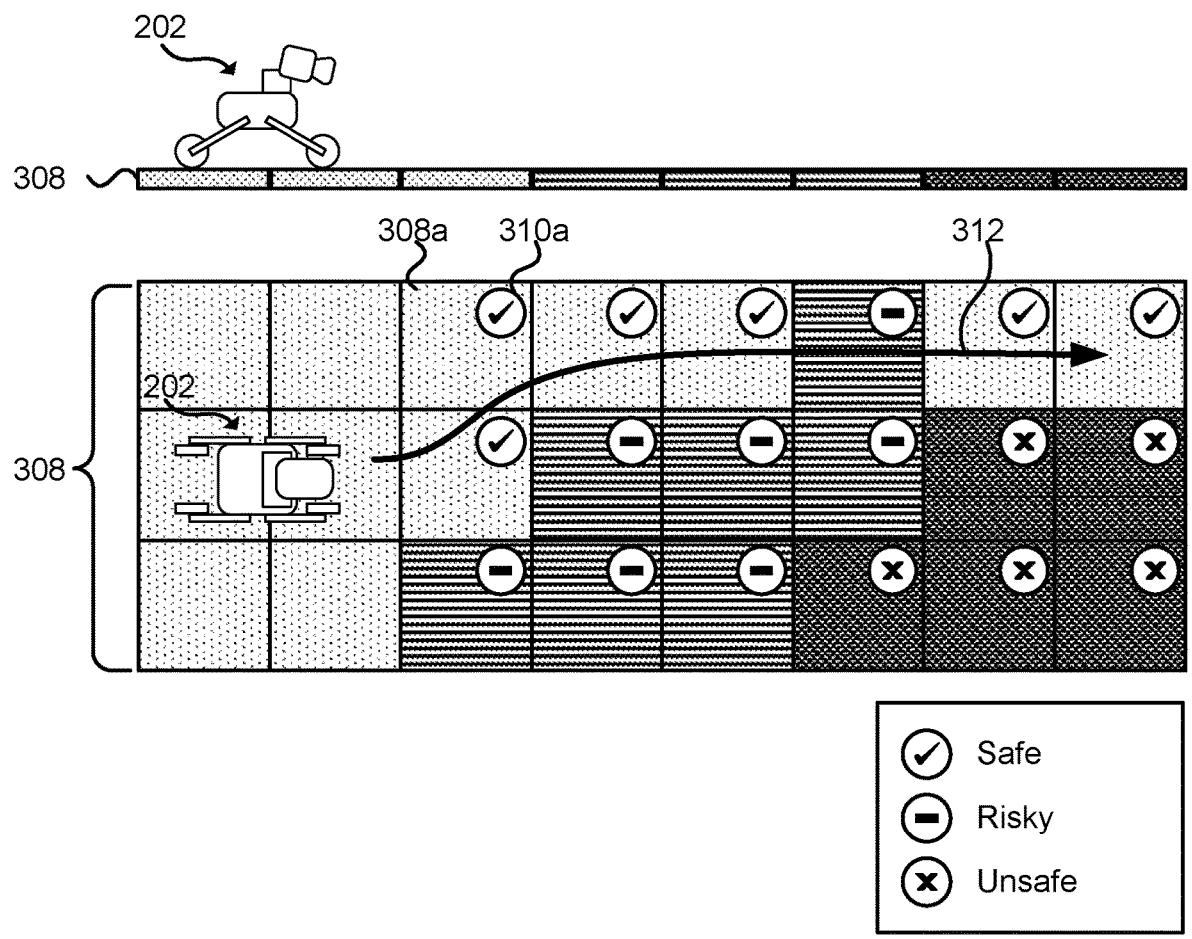
FIG. 3 depicts use of the trained terrain trafficability assessment functionality.

FIG. 3 depicts use of trained terrain terramechanics models. After training the rover 100, it may be deployed to the operational environment where it most traverse new terrain 308. The training terrain is selected to have similar characteristics as the expected operational terrain. The rover 202 captures images of the terrain 308 and uses the trained classifiers and trafficability models to predict a hazard level with different regions of the terrain. As depicted for region 308a, a region may have a hazard level 310a determined, which may then be used for determining a path or route 312 through the terrain. As depicted, the hazard levels may be provided from a set number of levels or ranges, depicted as "safe" indicating that it is predicted that the rover will be able to safely traverse the terrain without getting stuck, "risky" indicating that it is predicted that there is a risk that the rover will get stuck while traversing the terrain and "unsafe" indicating that it is predicted that rover will likely get stuck when traversing the terrain. Although described as getting stuck, it is noted that depending upon the terrain type, the rover may not actually become immobile, but rather is not capable of forward progress on the route. For example, while the rover may be stuck and immobile in loose sand when the slope is too great, the rover may be considered as stuck on rock although it may be able to move, for example backwards, if the slope is large enough that the rover can no longer move forward or "up" the rock. The operational phase is described in further detail below with reference to FIG. 5. FIG. 3 depicts determining the hazard levels of regions of the terrain, which is used in determining the route for the rover to travel. Feedback of the predictions is not depicted in FIG. 3. As previously described, when the rover traverses a particular terrain region, for example region 308a, it detects the actual characteristics, such as the actual slope and the actual slip experienced, and compares them to the predicted values. Depending upon how closely the predicted values compare to the actual measurements, the rover may update the trafficability model with the actual measured values, may adjust the hazard level mappings, or may halt the rover and send the data to a remote location for manual review and adjusting of the models.

The above has described the rover as operating in two phases. The first phase being a training phase that occurs at one or more training sites and is used to both train the visual terrain classifiers and the trafficability models associated with the different terrain types. The second phase is the operational phase in which the rover is deployed to the operational environment or site and the trained classifiers and trafficability models used to predict hazard levels of the terrain. Depending upon where the rover is deployed to and the similarity of the visual characteristics of the operational environment to the training environment, training the visual classifiers in the training environment may provide unsatisfactory results. For example, the visual appearance properties such as color and texture of a planetary surface the rover is deployed to may differ significantly from the training environment, due to for example atmospheric, lighting, or other effects such as the presence of dust or fog. Accordingly, the training phase may be split to an initial training phase performed in the training environment that trains the trafficability models associated with different terrain types and a secondary training phase performed in the operational environment that trains the terrain classifiers using captured images. Additionally or alternatively, the terrain classifiers may be bootstrapped using images of different terrain types captured of the operating environment, or environment having similar visual appearance properties, from different sources, such as other rovers, satellites, etc.

If the terrain classifiers are trained at the operational site, the rover may monitor measured physical features that are captured during an initial rover traverse over the terrain. During traverse, the rover may also capture images of the terrain patch being traversed. The measured physical features are correlated to the feature signatures captured at the training environment. When a physical feature signature measured at the operational site is determined to be "sufficiently close" to an a priori terrain signature, the rover may present the image of that terrain to a human expert supervisor. The human expert supervisor may then verify that the image or images are of sufficiently high quality for inclusion in a visual terrain class associated with that physical feature signature. Once a terrain classifier is trained, the rover may switch to an operational phase in which the terrain classifier and corresponding terramechanics model are used to predict trafficability. During the operational phase, the terrain classifiers, and the terramechanics models may be trained further as described further below. Further, if the rover does not train all of the visual terrain classifiers during the initial traverse, for example because there is no rock terrain types around the rover, the training may be returned to upon detecting the terrain, which may be based on, for example the predicted behaviours no longer matching the measured values.

Figure 4:
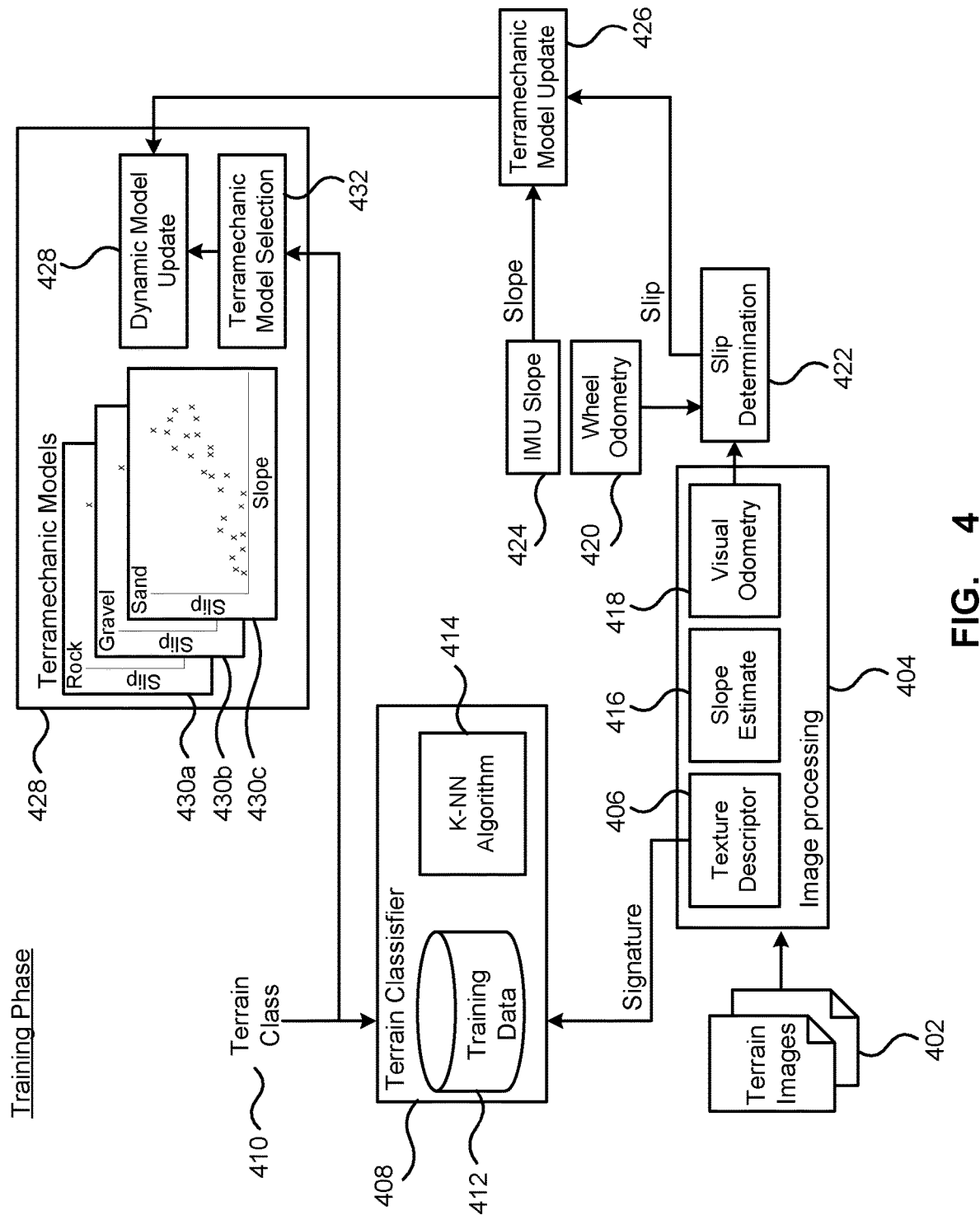
FIG. 4 depicts trafficability assessment functionality during a training phase.

FIG. 4 depicts trafficability assessment functionality during a training phase. As depicted in FIG. 4, terrain images 402 are captured and provided to image processing functionality 404. The terrain images 402 may be stereoscopic images to allow the slope of the terrain to more easily be predicted from the images. The image processing functionality 404 may include texture descriptor functionality 406, slope estimation functionality 416 and visual odometry functionality 418. The texture descriptor functionality 406 generates a signature of regions or segments of the terrain from the received images 402. Various descriptors may be used such as GIST or HOG descriptors. If the images are stereoscopic images, a single texture descriptor may be generated for regions within the pair of images, either from a single representative image of the stereographic pair, or from a combination of the stereographic pair. Different image texture descriptors are known that may be used to generate the signature of the region of the terrain. The slope estimation functionality 416 estimates the slope of the regions of the images. The visual odometry functionality 418 determines a distance travelled by the rover. The visual odometry functionality 418 may use the terrain images 402 or may use images captured from imaging devices more suited to the visual odometer functionality. For example, the terrain images 402 may capture a wide angle of the terrain ahead of the rover, which is well suited for planning a route through the terrain, however, a narrower field of view images capturing the terrain directly in front of the rover, or near the rover's wheels may be better suited for use by the visual odometry functionality 418. Both the texture descriptor functionality 406 and the slope estimation functionality 416 are performed on regions, tiles or segments, of the terrain. The terrain images 402 may be pre-segmented to be limited to a single region, tile or segment. Alternatively, the terrain images may be a complete image of the terrain and may be segmented by the image processing functionality. The terrain images captured from the terrain imaging system are segmented into a grid of segments or regions. Although depicted as being segmented into a grid of distinct cells, the particular cell size may vary. The cell size may be as small as individual pixels up to tens of pixels, 100s of pixels or more. Further it is possible to segment the images in other ways than a grid.

The texture descriptor functionality 406 provides a signature of the terrain region to terrain classifier functionality 408. An indication of the terrain class 410 is also provided. The terrain class may be specified by a human operator, either during the training at the training site or during the training at the operation site. The terrain classifier functionality 408 is depicted as being a K-nearest neighbour classifier and comprises a set of training data 412, which comprises the signatures and associated terrain class. The terrain classifier may further comprise the k-nearest neighbour functionality 414 for performing the k-nearest neighbor algorithm that determines a terrain class for an unknown signature based on the training data.

During the training phase, the rover traverses the different terrain types for different slopes, up to and including the limit of trafficability. The rover captures various sensor data which are then used to generate a trafficability model for the particular terrain type. The sensor data is depicted as being the wheel odometry information from the wheel odometry functionality 420, which is provided to slip determination functionality 422. The slip determination functionality determines an amount of slip by comparing the wheel odometry information provided by wheel odometry functionality 420 to visual odometry information provided by the visual odometry functionality 418. The slip information, along with slope information provided by the IMU slope functionality 424 is provide to terramechanics model update functionality 426. The model update functionality 426 may determine whether the received slip and slope information should be used in training, or updating the terramechanics model. For example, if the slope or slip estimations are associated with a large error, for example due to a bad reading, or poor image quality used in the visual odometry, or if the received slip and slope information was captured under unfavourable or undesirable conditions such as on a cross-slope, the model update functionality 426 may determine that the models should not be updated. However, when it is determined that the model should be updated, the measured slip and slope data is provided to terramechanics model functionality 428. As depicted, the terramechanics model functionality 428 may comprise a plurality of terramechanics models 430a, 430b, 430c each for a respective terrain type, depicted as being 'Rock', 'Gravel', and 'Sand'. As depicted each model may be considered as a graph of measured slip vs slope for the different terrain types. The terramechanics model functionality 428 may further comprise terrain mechanics model selection functionality 432 that selects or retrieves the appropriate model based on a received terrain class. During the training phase the terrain classes may be specified by human operators, while during the operational phase the terrain class may be provided from the terrain classifier functionality 408. The terramechanics model functionality 428 further comprises dynamic model update functionality 434 that updates the appropriate terramechanics model using the measured data. The dynamic model update is described in further detail with particular reference to FIG. 6.

As described above, the terrain classifier may be trained at the training site, or at the operational site if the visual appearance of the two locations differs and so will make the signatures of the same terrain types appear different. If trained at the training site, the terrain class 410 label provided to the terrain classifier functionality 408, may be provided by the human operator. If the terrain classifiers are trained at the operational site, the terrain class label may be provided by the rover, and verified by a human operator. The terrain images, and/or the signatures, may be provided to the human operator along with the terrain class of the terramechanics model that best matches the measured behaviour of the rover while traversing over a particular distance of the terrain. That is, the rover measures the slopes and associated slips over a distance and determines which of the terramechanics models most closely match the measured slope/slip data and selects the closest model as the possible terrain class. The possible terrain class, the images, signatures and measured data may be returned to the remote control location for verification by a human operator. If the terrain class is verified correct by the human operator, the signature data and associated terrain class may be added to the training data. During the training phase at the operational site, the hazard level may be predicted using the worst case scenario of all of the terramechanics models to ensure that, regardless of the particular terrain type, the rover can safely traverse the terrain.

Figure 5:
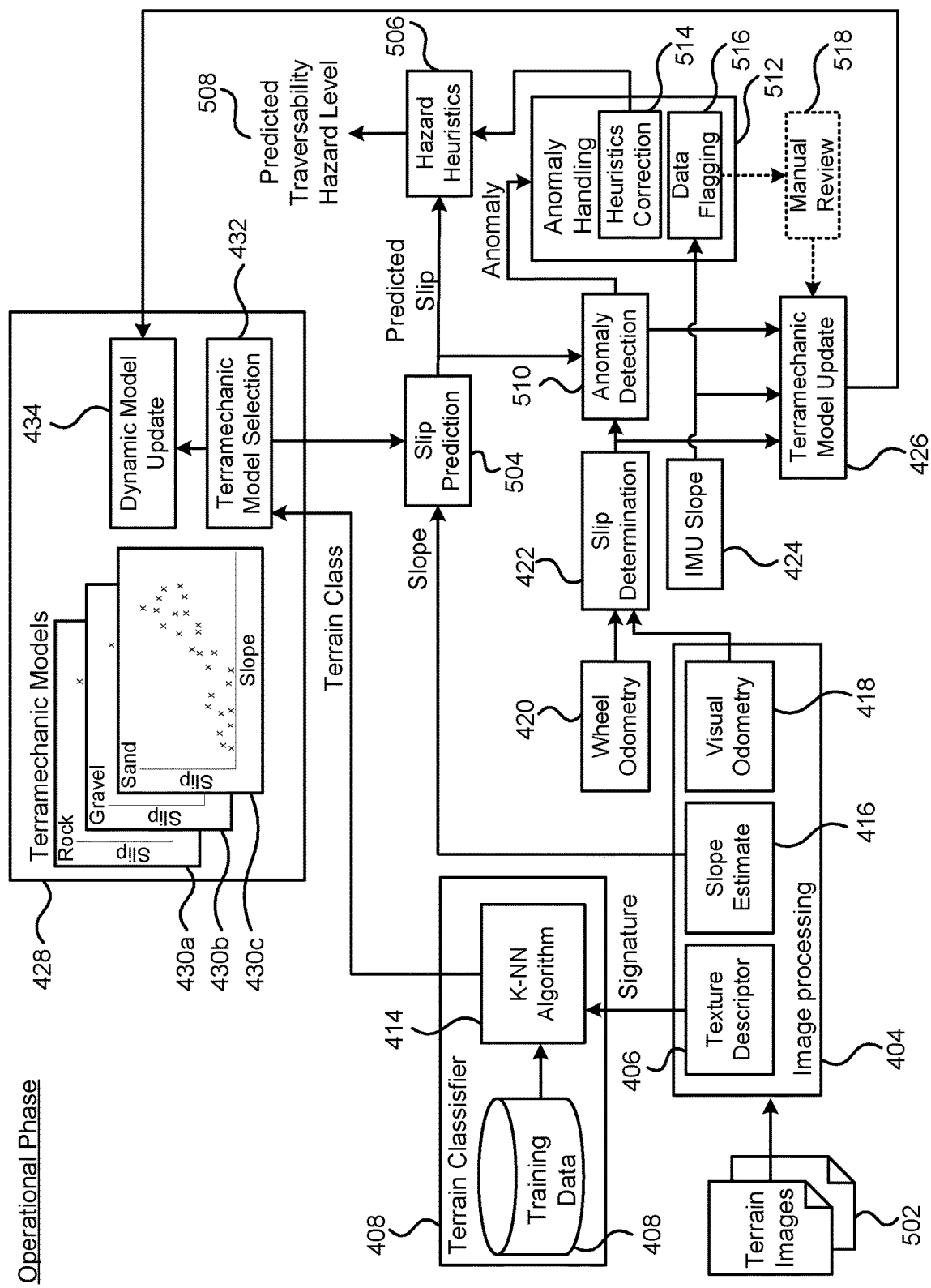
FIG. 5 depicts trafficability assessment functionality during an operational phase.

FIG. 5 depicts trafficability assessment functionality during an operational phase. Many of the components and functionality depicted in FIG. 5 correspond to those in FIG. 4 and as such will not be described in further detail. In FIG. 5, it is assumed that both the terrain classifier functionality 408 and the terramechanics models have been trained and are being used to predict the hazard levels for traversing the different regions of the terrain. During operation, and as described further below, the hazard levels are predicted from the captured images of the terrain ahead of the rover. Accordingly, the rover does not need to traverse the terrain in order to predict the hazard level. When the rover does traverse a region of terrain, the actual slip is measured and compared to the predicted slip to determine if any actions should be taken. The actions may include updating the terramechanics models with the measured data, adjusting the mappings used to determine hazard levels, or halting the rover and sending the captured data for human review.

Terrain images 502 of the operational terrain are captured and provided to the image processing functionality 404. As described above, the terrain images may be provided as segments of terrain, or may be segmented into a grid of cells of the terrain. The texture descriptor functionality 406 generates the signatures for the different segments or cells. Although the following describes processing a single segment, it will be appreciated that similar processing is performed for each of the segments of the terrain. The signature is provided to the terrain classifier functionality 408, which uses the k-nearest neighbour functionality 414 to determine the terrain class for the signature from the training data 412. The determined terrain class is provided to the terramechanic model selection functionality 432 that selects the terramechanics model corresponding to the determined terrain class. The slope estimation functionality 416 processes the images, or portions of the images corresponding to the segment in order to estimate the slope of the terrain segment. The selected model is used by slip prediction functionality 504 to predict the slip on the terrain class having the estimated slope.

The slip may predicted in various ways. For example, the expected slip at a given queried slope, $\varphi$, may be determined in two steps, with an initial and final estimate. In the first step, an initial slip estimate is calculated for all slopes less than or equal to the queried slope. This initial estimate for any slope value, $\theta$, depends on the amount of data in various parts of the data structure of the terramechanics model. If the number of data points in the data structure at $\theta$ is sufficiently, i.e. $n(\theta) > N/4$, then:

$$\overline{slip}_{init}(\theta) = \frac{\sum slip(\theta)}{n}$$

If $n(\theta)) <= N/4$ but there exists a slope value, $\beta$, where $\beta > \theta$ and $n(\beta) > N/4$, then the initial slip estimate at $\theta$ is interpolated based on all the data in the full data structure (i.e. the data at all slope values). Specifically, cubic polynomial regression may be used to predict slip vs. slope with a constrained y-intercept. The y-intercept constraint is designed to prevent unstable results at low slope values in cases where there is little or no data at these low slope values (an unconstrained calculation would in such a case behave like extrapolation, which is very sensitive to small variations in the data when using cubic polynomial regression). The y-intercept for the regression is fixed at $Slip_{0,i}$ which is the average slip from the N lowest-slope data points in the data structure for terrain i.

During the initial estimation stage, if $n(\theta) < N/4$ and there does not exist a slope where $\beta > \theta$ and $n(\beta) > N/4$, the initial estimate of slip at that slope is simply 0; and the final estimation stage is required to handle these cases.

In the final stage of calculating expected slip, a check is performed to ensure that the expected slip monotonically increases with increasing slope. In other words:

$$\text{ExpectedSlip}(\varphi) = \max(\overline{slip}_{init}(\theta \leq \varphi))$$

Finally, an additional check is performed in cases where $n(\theta) < N/4$ and there does not exist a slope where $\beta > \theta$ and $n(\beta) > N/4$; in such cases the final expected slip at $\varphi$ is extrapolated. To extrapolate, the highest expected slip at any terrain for the queried slope is used, and is potentially further increased if $Slip_{0,i}$ is greater than $Slip_{0,j}$, i.e. $Slip_0$ for the terrain with maximum expected slip. In other words:

$$\text{ExpectedSlip}(\varphi)_i = \max\left(\text{ExpectedSlip}(\varphi)_j * \max\left(\frac{Slip_{0,i}}{Slip_{0,j}}, 1\right)\right)$$

Regardless of the particular technique used to predict the slip expected on a particular terrain type having a given slope, the predicted slip is provided to hazard heuristics functionality 506 that maps the predicted slip amount to one of a fixed number, for example three, hazard levels. The hazard heuristics functionality may comprise different mappings for each of the different terrain classes. The hazard heuristics functionality 506 provides the predicted hazard level 508, which may be specified as <low, medium, high> or <safe, risky, unsafe> or <1,2,3> or any other level labels desired. The predicted hazard level for each segment may be used by route planning functionality (not depicted in FIG. 5) that plans a route through the terrain segments.

The particular hazard mappings may be set at various levels depending upon the desired application, and may be assigned based on probabilistic estimate of mobility hazard based on raw data and the predicted slip value. Hazard levels may be assigned to three heuristic metrics labelled, for example as either low, medium, or high.

The 20% slip mark may be treated as an important threshold, because traction performance begins to plateau around 20% slip for many wheels (or tracks) in soft soils while negative effects such as sinkage increase. Further, it has been observed during field testing that once slip reaches 20%, high variations in slip are observed. Although not wishing to be bound by theory, it is believed that since the traction developed by the rover is limited by the maximum shear stress of the soil, soil shear failure initiates at approximately 20% slip. The failure mechanism in the soil is such that it results in a sudden loss of traction followed by sinkage and a subsequent buildup of soil ahead of the wheel. The resulting effect is sudden and high variations in slip measurement once 20% slip has been reached. Embedding events occur when the soil shear failure, slip and material buildup occurs iteratively until the wheel has sunk into the soil beyond a critical threshold.

The criteria for the transition from low to medium risk may thus be set at the first slope where more than 5% of data points within the slope bin are over 20% slip OR the ExpectedSlip is predicted to be >20%. The latter (i.e. ExpectedSlip>20%) may address cases that lack sufficient data for the probabilistic calculation and are based on interpolation or extrapolation The criteria for the transition from medium to high risk may be set at the slope where more than 67% of data points within the slope bin are over 20% slip OR the Expected Slip >50%.

The above has described determining the hazard level based on the slip. The hazard level of traveling over a region may take into account other factors as well. For example, the hazard level may take into account vehicle characteristics, such as approach/exit angles, center of gravity or other vehicle characteristics that may limit the vehicle's ability to traverse the terrain regardless of the slip levels. For example, a vehicle may not slip on particular terrain, but could possibly roll-over if there is a cross-slope, which could be reflected in the hazard level.

The rover further includes a feedback mechanism that compares the predicted behaviour for a segment with the measured behaviour when the rover traverses the terrain segment. When the rover traverses a terrain segment, the slip determination functionality 422 determines the actual slip based on the wheel odometry information determined by the wheel odometry functionality 420 and visual odometry information provided by the visual odometry functionality 418 and provided to anomaly detection functionality 510. The anomaly detection functionality compares the actual slip to the previously predicted slip, and if an anomaly is detected, for example if the difference between the predicted slip and the measured slip exceed a certain threshold, anomaly handling functionality 512 determines an action to take.

An anomaly may be determined to have occurred when high slip is detected. High slip detection can be used to take appropriate action when the terrain may have become more hazardous than expected and is able to update the hazard levels of the terramechanics model in real time. A high slip event is detected when slip goes outside the range predicted by the terramechanics model for a given terrain type. The inputs for this algorithm are the terrain type that the rover is currently driving on, the current slip, and the current slope.

The terramechanics model contains a set of slip vs slope data recorded on a terrain type and may be used to provide associated hazard levels such as low, medium, high. The models may also be used to determine the average slip and the 2-sigma slip range. This information may be used to predict a range of possible slip values given a slope input for a particular terrain type. That is:

$$(slip_{min}, slip_{max}) = f(slope_i)$$

Similarly, the information from the terramechanics models may be used to predict a range of slopes that may produce a given slip input. That is:

$$(slope_{min}, slope_{max}) = f(slip_i)$$

A high slip event, or anomaly, may be determined when the measured slip is greater than the maximum slip predicted by the terramechanics model for the measured slope. Depending upon how different the differences is, the rover may continue to traverse the terrain, but the hazard heuristics may be updated to be more conservative. Additionally or alternatively, if the difference is greater than a threshold, the rover may be halted. The anomaly handling functionality 512 may include heuristics correction functionality 514 that, if the anomaly is not considered severe, can adjust the hazard heuristics mappings to be more conservative. The heuristics mappings may be updated using a high slip bias which is a measurement of how far away the measured slope is from the minimum slope predicted by the terramechanics model that could produce the measured slip.

$$\text{HighSlipBias}_i = \text{slope}_i - \text{slope}_{min}$$

The average high slip bias of the most recent n data points can be used to shift the hazard level heuristic mappings to more accurately represent the terrain when an anomaly or high slip event occurs according to:

$$\text{HazardLevelShift} = 1/n \Sigma_{i=0}^{n} \text{HighSlipBias}_i$$

Figure 6A:
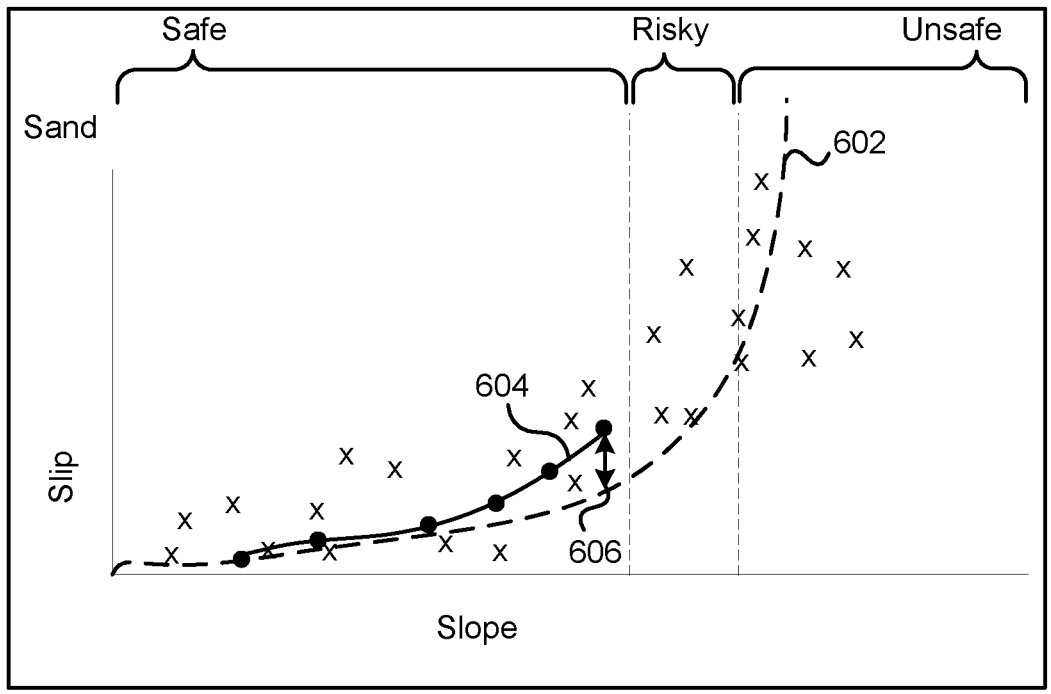
FIGS. 6A and 6B depict hazard level adjustments for a terramechanics model.
Figure 6B:
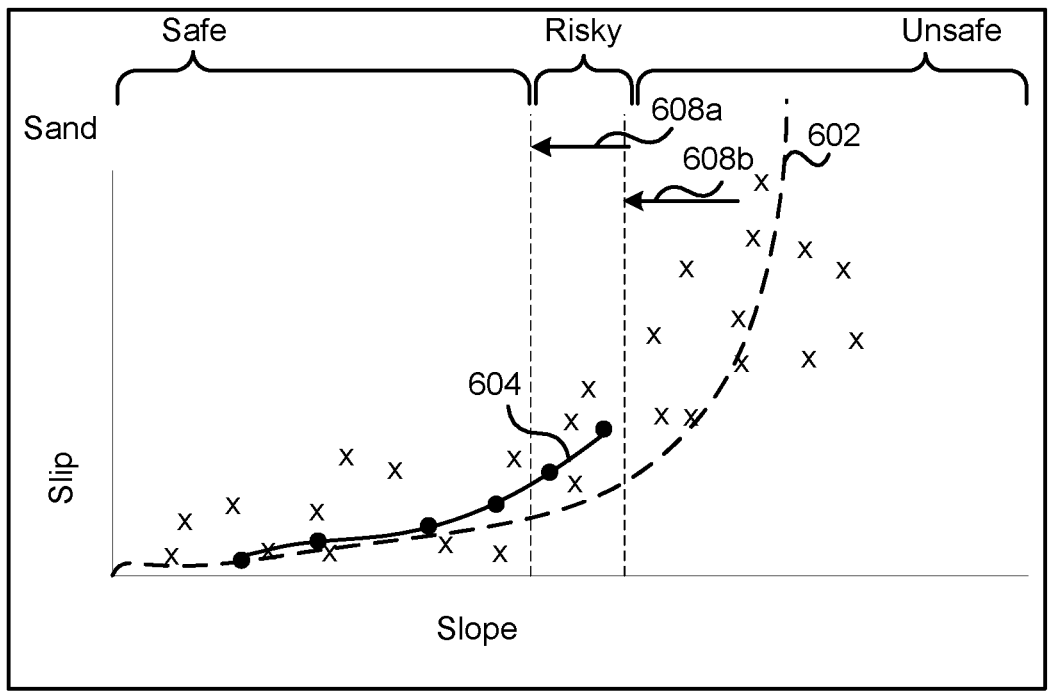

FIGS. 6A and 6B depict the hazard level heuristic shifting. In FIGS. 6A and 6B line 602 represents the average slip while line 604 represents the measured slips. When the actual slip exceeds the predicted high slip amount, depicted by arrow 606, the hazard levels for the safe, risk and unsafe heuristics can be shifted by the hazard level shift amount. The hazard levels are depicted as being shifted by amounts 608a, 608b between the levels in FIG. 6A and FIG. 6B.

Figure 7:
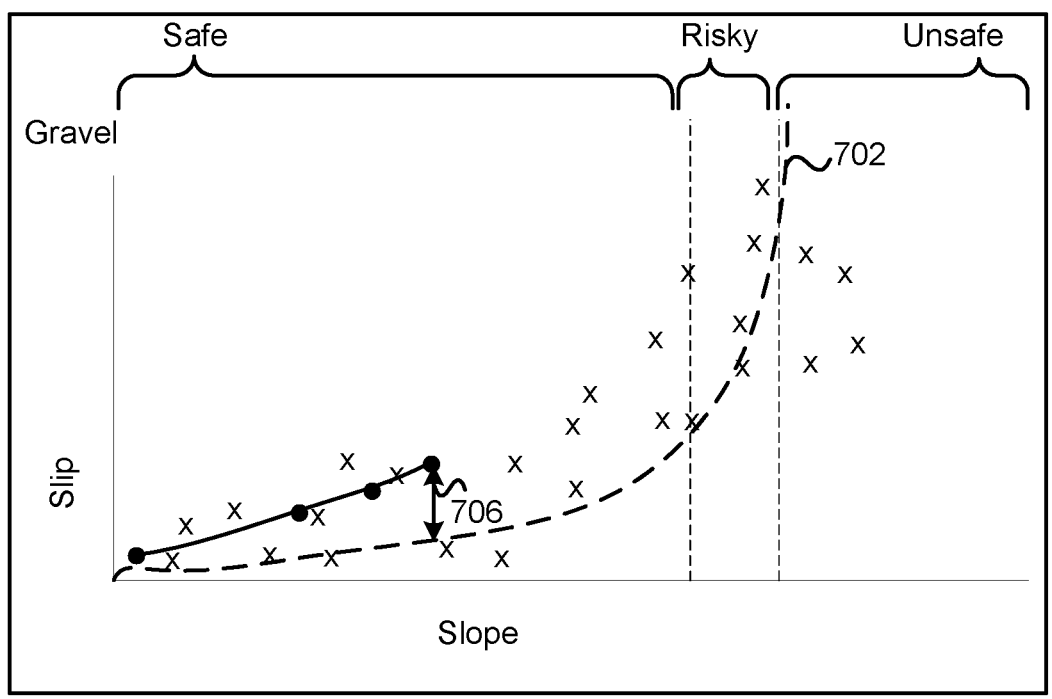
FIG. 7 depicts a critical or severe anomaly for measured slip.

FIG. 7 depicts another high slip event or anomaly. In FIG. 7, the difference between the detected slip 704 and the predicted high slip 702, represented by arrow 706, is assumed to be larger than a threshold indicative of a critical or severe anomaly. When a critical or severe anomaly occurs, it may be indicative of potentially bad models that do not predict the slip correctly and as such, the rover may be halted, rather than adjusting the heuristic hazard levels. In FIG. 7, the critical anomaly may be detected before the measured slip level raises above a risky or unsafe threshold and as such, the models and/or classifiers may be evaluated and corrected by manual review.

In addition to adjusting the hazard heuristics, the anomaly handling functionality 512 may further include data flagging functionality 516 that flags the relevant collected to for communicating back to the remote control location for manual review 518. The relevant data may include, for example the terrain images, and the measured slip and slope. Other information may also be provided, such as the terrain signature, determined class, estimated slope, predicted slip etc. However, the remote control location may maintain corresponding functionality that may determine these values from the images. Other data may include environmental parameters, and rover parameters. A human expert may review the flagged data and determine the cause for the anomalous behaviour as well as the necessary corrections. The corrections are depicted as being provided to the terramechanics model update functionality 426, which may then be used to update the terramechanics model, however other options are possible. For example, the manual review may indicate that a new model and terrain class should be provided, along with the appropriate training data and terramechanics model. As will be appreciated, the particular corrective actions determined by the manual review may vary however, can be implemented by updating the terrain classifier, the terramechanics models and/or the hazard heuristics.

The data flagging and manual review 518 may be performed for all detected anomalies. The flagged data may be collected for a period of time a transmitted back to the remote location for review. If the anomaly is not severe, the hazard heuristic mappings may be adjusted automatically in order to provide a more conservative hazard level mapping to account for the anomalous behaviour and the rover may continue to traverse the terrain. If however, the anomaly is considered severe, the rover may be halted and the data flagged and transmitted for manual review. Once the terrain classifier, terramechanics models, and/or hazard heuristic mappings are updated to address the anomalous behaviour, the rover can again begin traversing the terrain.

Figure 8:
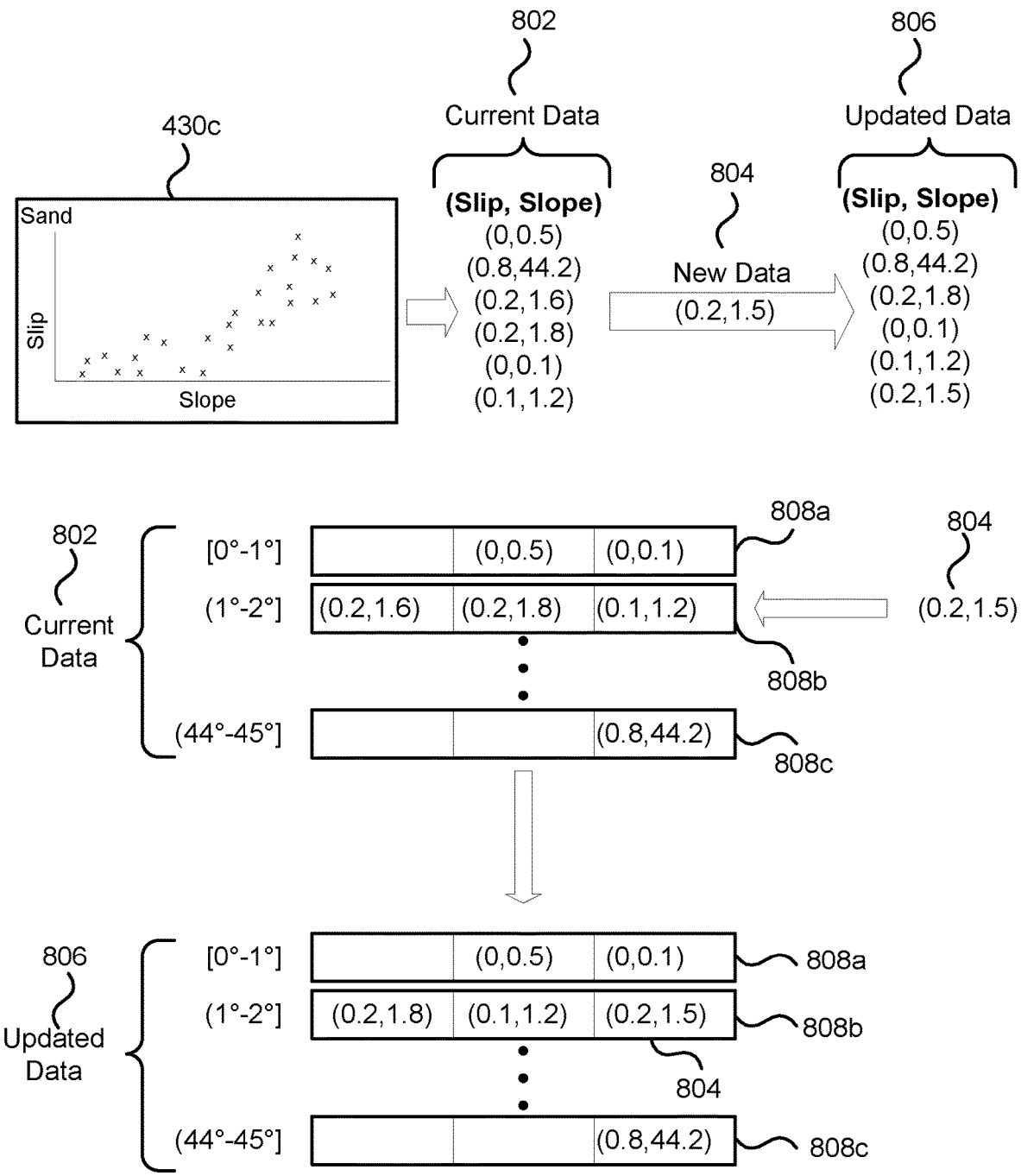
FIG. 8 depicts updating a terramechanics model.

FIG. 8 depicts updating a terramechanics model. As described above, the terramechanics models may be updated using new data from the rover. This dynamic updating allows the models to be updated to reflect the changing characteristics of the rover over time. For example, over time, the wheels or tracks of the rover may become damaged and so provide less traction resulting in higher slip rates. A particular terramechanics model 330c for a "sand" terrain class is depicted in FIG. 8. The terramechanics models may be data-driven, meaning that they directly link relevant inputs to outputs rather than assigning intermediary parameters to govern these relationships. The rover described above uses the exteroceptive input of terrain slope and the proprioceptive output of rover slip in its data-driven terramechanics models. While other parameters may be used, it was found that the slip vs. slope provided the best results. For example, wheel sinkage of the rover was examined as another possible dimension of proprioceptive output, but its effects on trafficability were found to be secondary to slip during field testing. For the terrains tested during development, significant sinkage only developed once slip had surpassed predictably hazardous levels; thus slip is the focus of the models' output described herein. However, it should be noted that these terramechanics models are specific to the terrains and rover used. As such, softer soils or rovers with smaller and more rigid wheels may result in sinkage, or other proprioceptive outputs being a more important trafficability metric. As for exteroceptive inputs, terrain roughness was initially considered alongside slope, but no correlation to slip was found; thus the focus of the models' input is slope and terrain class. Although the models were selected to output the predicted rover slip from the input slope and terrain class, other models may be trained to provide other predicted rover propriosecptive outputs such as wheel sinkage, vibration, etc. based on other inputs, such as terrain roughness, etc. When learning the data-driven terramechanics models, the slope associated with any terrain's incoming slip data point is measured proprioceptively using the IMU. Only during the prediction phase is the exteroceptive slope used directly with the model.

Each terrain's terramechanics model is thus a collection of paired rover slope and slip values, depicted as current data 802. These are stored in a data structure that continually updates using the most recently available new data 804 to provide the updated model data 806. When the model is updated, old data may be discarded. Specifically, the new data 804 may be segregated based on its slope value, into bins 808a, 808b, 808c spaced by, for example 1 degree, for example the bins may group slopes in bins of [0°-1°], (1°-2°], . . . (44°-45°]. Each bin contains at most N data points. In FIG. 8, N is equal to three, however in practice N may be larger, for example 25, 50, 100 or larger. Although FIG. 8 depicts the bin data as including the measured slope values, it is possible to maintain only the slope value for each bin. Once a bin at a particular slope value is full, that is it has N slip values, it behaves like a First-In-First-Out (FIFO) queue, meaning the oldest data is discarded and replaced with the incoming data. This is depicted in FIG. 8 where the new data 804 is added to the (1°-2°] bin 808*b* and the oldest, or left most in FIG. 8, data is discarded from the bin.

Figure 9:
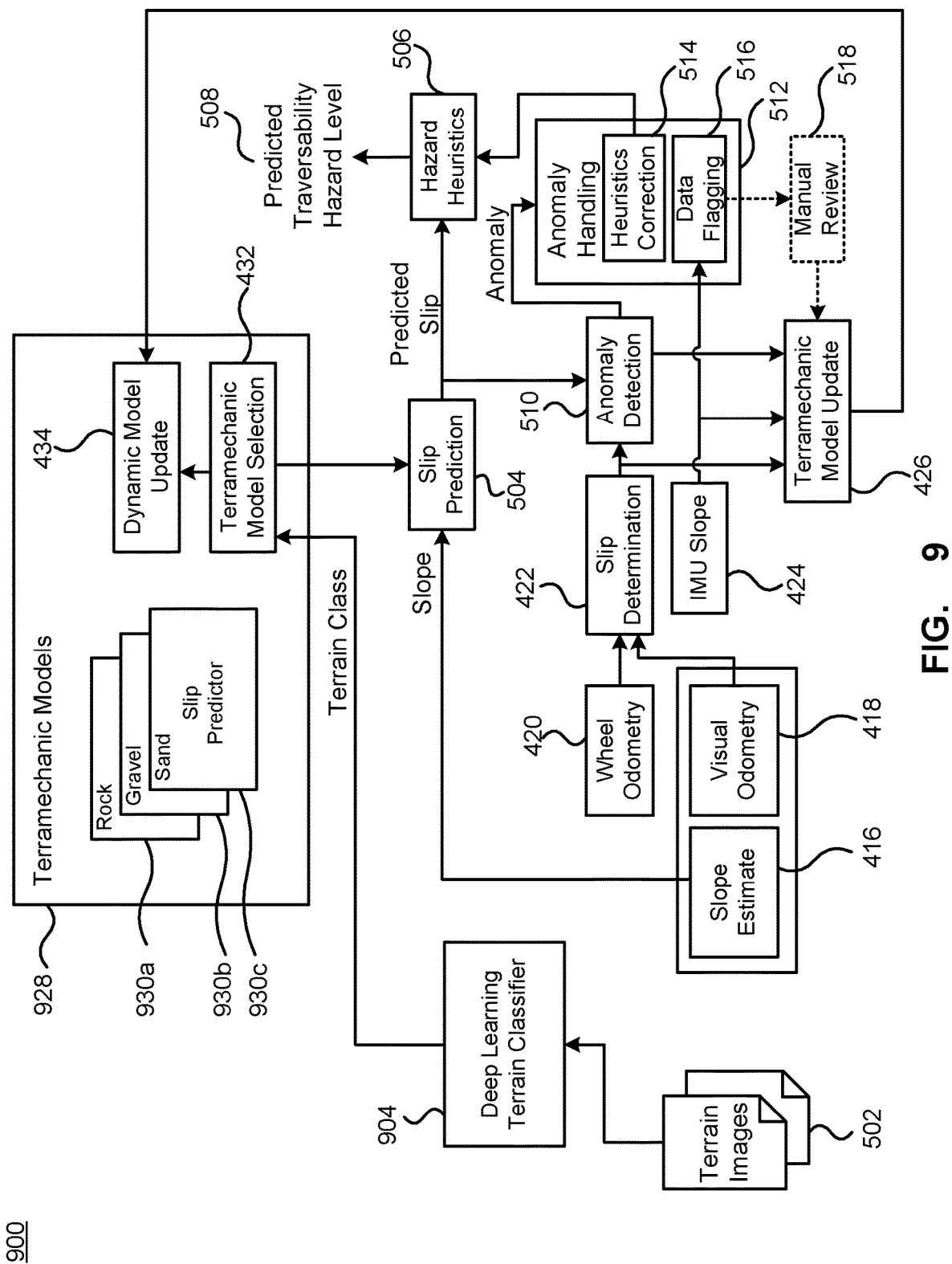
FIG. 9 depicts further trafficability assessment functionality during an operational phase.

FIG. 9 depicts further trafficability assessment functionality during an operational phase. The trafficability assessment functionality 900 is similar to that depicted in FIG. 5, however the deep learning terrain classifier 904 uses deep learning techniques for classifying the terrain of the images 502. As described with reference to FIGS. 4 and 5 above, terrain images were classified using texture descriptor functionality 406 that generated a signature, which was then used by a k-nearest neighbor algorithm to determine the terrain class. As depicted in FIG. 9, the texture descriptor functionality, training data and k-NN algorithm functionality has been replace with a terrain classifier that uses deep learning in order to determine terrain classes of the images. The deep learning terrain classifier 904 may use various different techniques for classifying the images. For example, the deep learning terrain classifier 904 may use convolutional neural networks (CNNs), recurrent neural networks (RNNs) including long short term memory (LTSM) as well as other techniques for deep learning. The deep learning terrain classifier 904 may be trained using a collection of different images of the different terrain classes. The training images may be collected from the vehicle or may be collected from other sources. Further, the terrain classifier may be first partially trained on similar data and then trained on the particular terrain classes using transfer learning techniques.

The deep learning terrain classifier may be applied to individual segments of the image, in which case the image may be segmented into a grid, or other arrangement, of cells. The segments or cells may then be classified according to the particular type of terrain present. Rather than classifying the segments or cells, the deep learning terrain classifier may use semantic segmentation techniques in order to infer or determine the terrain class of each individual pixel. Subsequent determinations, such as predicted slip may also be determined for each pixel, or may be determined for a group of pixels, for example a group of pixel corresponding in size to a contact patch of the vehicle's tires. Similarly, comparisons such as comparing a predicted slip to actual slip may be determined at the pixel level or at groups of pixels.

In addition to replacing the texture descriptors and k-nearest neighbors algorithm with deep learning terrain classification functionality, the trafficability assessment functionality 900 may also differ from the trafficability assessment functionality described above with particular reference to FIGS. 4 and 5, by using different terramechanics models 928. The terramechanics models may comprise a plurality of different slip predictor models for each terrain class 930*a*, 930*b*, 930*c* (referred to collectively as slip predictor models 930). The slip predictor models may use various techniques, including machine learning and deep learning techniques, for predicting slip of the vehicle at a future location based on current information.

Figure 10:
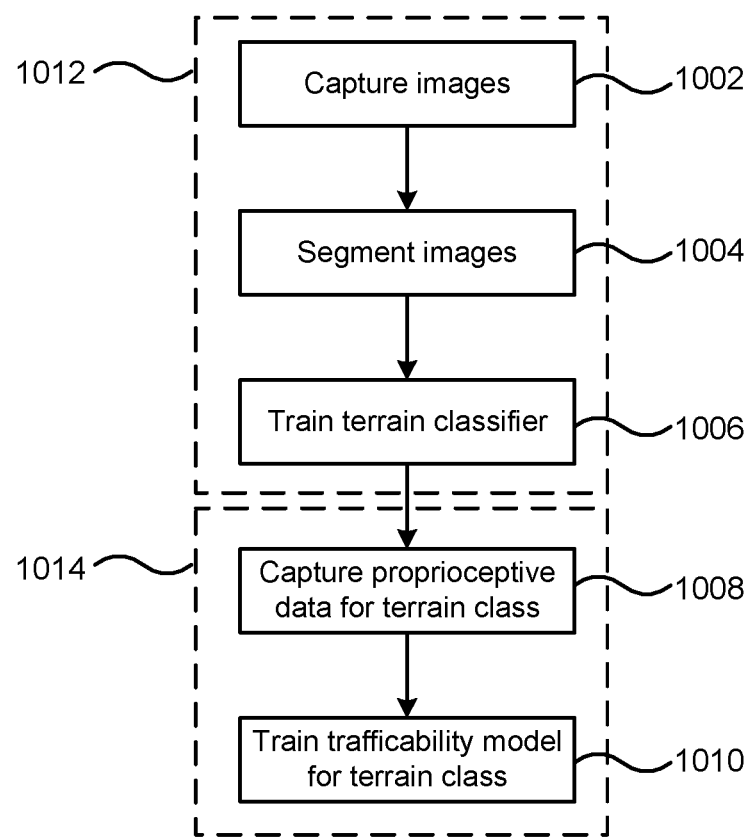
FIG. 10 depicts a method of training the trafficability assessment functionality.

FIG. 10 depicts a method of training the trafficability assessment functionality. As described above, the trafficability assessment functionality comprises terrain classifiers that given images, or image signatures, can output a likely terrain class and terramechanics models for each terrain class that can predict a slip amount for a given slope. The trafficability assessment functionality is initially trained by capturing images (1002) of terrain. The images may be captured from a stereoscopic camera. The images are segmented into a grid of cells (1004) which can be individually labelled with a respective terrain class by a human, and then the labelled image segments are used to train the terrain classifier (1006). The terrain classifier may be trained, by for example storing the image segments, or a texture descriptor signature of the image segment in association with the label. The rover also captures proprioceptive data when the rover traverses a particular terrain class (1008). The proprioceptive data may be for example the slope and slip, as described in detail above, although other proprioceptive data may be captured as well. The captured data is used to train a terramechanics model for the terrain class (1010) as well as setting the hazard heuristics levels for the terrain class. The training of the trafficability assessment functionality broadly comprises training the terrain classifiers 1012 and training the terramechanics models 1014. Although depicted as occurring in sequence, it is possible for the two training portions to be separated. For example, the terramechanics models may be trained using data captured at a training site or sites that have terrain that provides, or is believed to provide, a good analog to the different terrain types expected to be encountered in operation. Rather than using images captured by the rover at the training sites to train the terrain classifiers, the training of the terrain classifiers may use images captured of the operational site or similar sites by other rovers, or may use images from the rover at the operational site.

Figure 11:
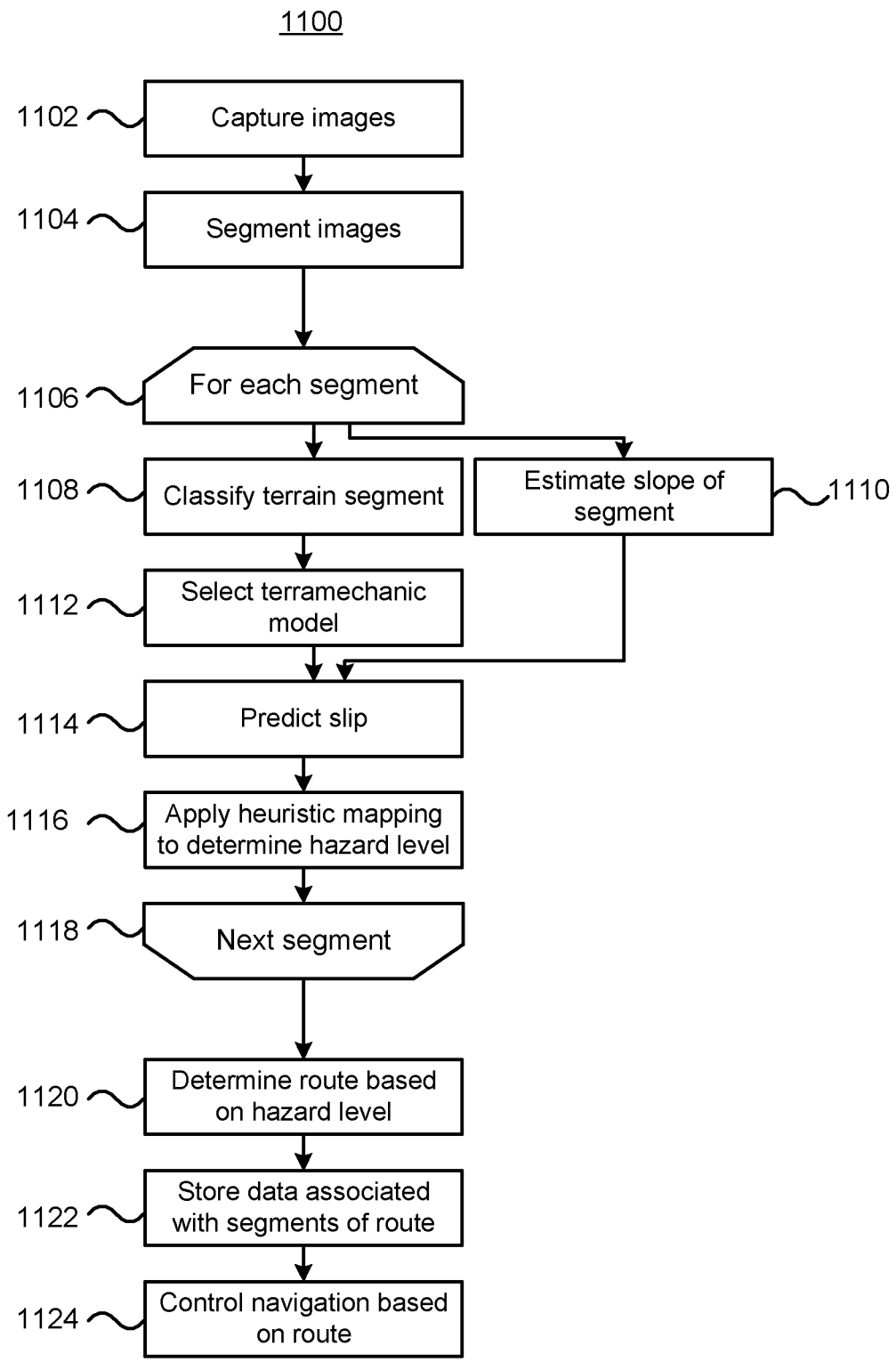
FIG. 11 depicts an operational method of the trafficability assessment functionality.

FIG. 11 depicts an operational method of the trafficability assessment functionality. The method 1100 users the trained terrain classifiers and terramechanics models and may be used by the rover for navigating between a start point and a destination. The method 1100 begins with capturing images (1102) of the terrain ahead of the rover. The images may be captured as stereoscopic pairs. The images are then segmented into regions or cells (1104). For each of the segments (1106) the terrain segment is classified (1108) using the trained terrain classifiers. Although the segmentation and classification are depicted as separate steps in FIG. 11, it is possible that the segmentation and classification may be performed by the same process. For example a semantic segmentation process may label each pixel, or group of pixels, with an appropriate terrain classification. The images or image segments may also be processed to estimate a slope of the segment (1110). Once the terrain segment is classified, the corresponding terramechanics model is selected (1112) and used to predict the amount of slip (1114) the rover may experience when traversing the terrain of the segment. The amount of slip is predicted from the terramechanics model using the estimated slope of the terrain segment. A heuristic mapping for the terrain class is applied (1116) to the predicted slip in order to determine a hazard level for the slip amount and terrain class. Once the segment's hazard level is determined, the next segment may be processed (1118). Although depicted as processing segments sequentially, it is possible to process the segments in parallel. Once the hazard level for all of the segments have been determined, a route is determined using the hazard levels of the segments (1120). As a trivial example, the route may be determined by traversing only 'safe' segments between the start and destination. Once the route is determined, the data associated with the segments on the route, such as the images of the segments, may be stored (1122) and then the rover can be controlled to navigate the route (1124).

Figure 12:
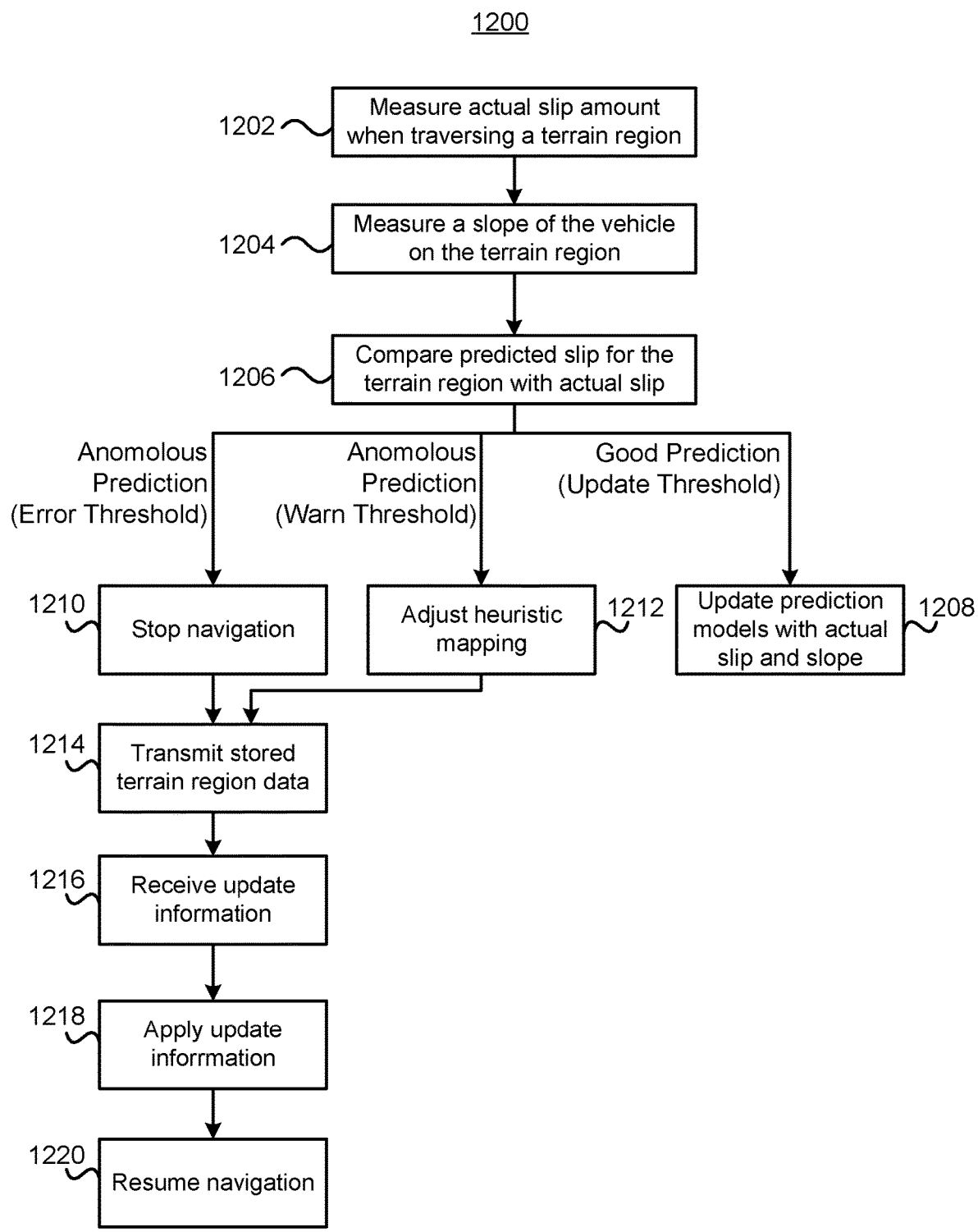
FIG. 12 depicts a method of anomaly handling during an operational phase of the trafficability assessment functionality.

FIG. 12 depicts a method of anomaly handling during an operational phase of the trafficability assessment functionality. The method 1200 begins with measuring an actual slip amount when traversing a region of terrain (1202) for which a slip amount was predicted and measuring the slope of the region of the terrain (1204). The predicted slip for the terrain is compared to the measured slip (1206) and if the predicted slip is a good prediction, the measured slip and measured slope may be used to update the terramechanics model (1226) of the terrain class of the region of terrain. If the comparison of the predicted slip to the actual slip indicates anomalous behavior, the action to take may depend upon on how large the difference is between the predicted and measured slips. If the difference is larger than an error or critical threshold the navigation of the rover may be stopped (1210). If the difference is within a warning threshold, the heuristic mapping for the terrain class that maps slip amounts to a hazard level is adjusted (1212). Regardless of whether the rover is stopped or the heuristic mappings are adjusted, the stored terrain region and rover data, such as the captured images of the region and the measured slip and slope are transmitted from the rover to a remote control location (1214). The received data is manually reviewed in order to determine why the anomalous behavior occurred and updates to the terrain classifiers and/or the terramechanics models can be determined and transmitted back to the rover. The rover receives the update information (1216) and applies the update information (1218). After applying the update information, if the navigation was stopped in may be resumed (1220).

The above has described systems and methods that may be used in controlling navigation of an autonomous or semi-autonomous vehicle based determining a hazard level of traversing a surface and then planning a route based on the predicted hazard levels. As described further below, the route planning may also take into account additional factors when planning a route.

Figure 13:
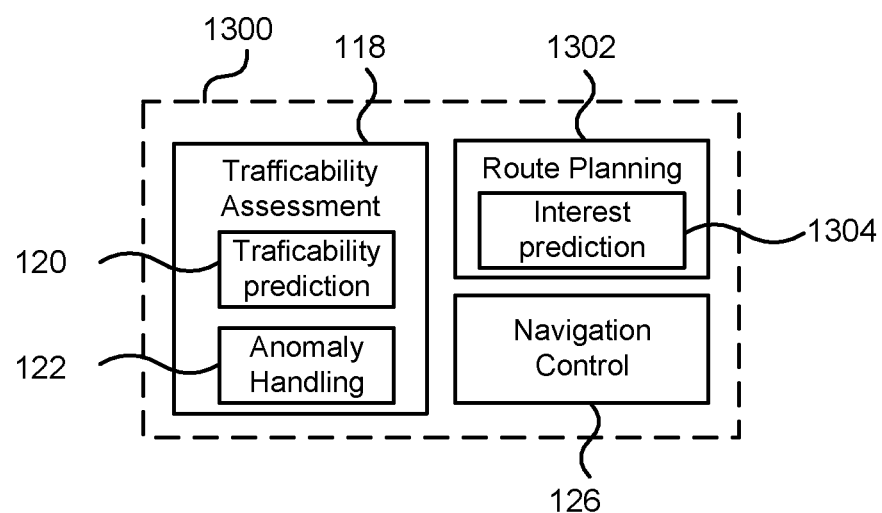
FIG. 13 depicts further rover functionality.

FIG. 13 depicts rover functionality. The functionality 1300 may be provided in a vehicle such as rover 100. The functionality 1300 may be implemented as instructions stored in a memory unit of the vehicle which when executed by a processor configure the vehicle to perform the functionality for planning a route based on predicted interest levels. It is possible for the route planning to take into account a potential interest level of certain areas as well as the hazard levels. For example, the images used in determining the hazard levels may also be used to identify areas of potential interest. The identification of areas of potential interest may vary depending upon the application. For example, the identification of possible known formations, patterns, objects, etc. may be identified within the images as being of possible interest. In some applications, it may be desirable for the vehicle to remain clear of the identified interest areas. In other applications, it may be desirable for the vehicle to approach the interest areas. Further, while in some applications it may be desirable to identify known formations, patterns or objects as being of interest, in other applications it may be desirable to identify unknown or unique formations, patterns, objects, etc. as being of interest. Such unknown or unique areas may be of interest for closer inspection by the vehicle. As will be appreciated the route planning may take into account both the hazard level of the terrain as well as the interest level of the terrain when planning a possible route through the terrain.

The functionality 1300 may include for example trafficability assessment functionality 118 as described above that may include trafficability prediction functionality 120 for predicting the trafficability, or hazard levels, of segments of terrain. The trafficability assessment functionality 118 may also include anomaly handling functionality 122 for identifying anomalies in the predicted trafficability compared to actual trafficability.

The trafficability information of the segments, which as described above may comprise regions of the images possibly as small as a single pixel to larger areas covering possibly tens of square meters of terrain or more, may be provided to route planning functionality 1302 for planning a route through the terrain. As depicted, the route planning functionality 1302 may include interest prediction functionality 1304 that predicts an interest level of segments of images. Although depicted as being provided as part of the route planning functionality 1302, the interest prediction functionality 1304 may be separate from the route planning functionality or possibly as part of the trafficability assessment functionality 118. The interest prediction functionality 1304 may attempt to identify known patterns, formations or objects within the images using image classification and identification techniques. Additionally or alternatively, the interest prediction functionality may attempt to identify novel features of the terrain. The identification of novel features in the terrain may be based, at least in part, on the image classification information used in determining hazard levels of the terrain. For example, in exploration applications, terrain classification may directly be related to identification of geological units or novelties in planetary exploration, related to scientific goals such as understanding planetary formation or searching for signatures of past life or water. In other applications, terrain classification may be related to identification of other features or novelties in a region.

Once the interest levels of segments of the images are determined, they can be used by the route planning functionality 1302 to determine a possible path for the vehicle, which may be used by navigation control functionality 126 for steering the vehicle through the terrain. The route planning functionality 1302 may use the determined interest levels as a weighting along with the hazard levels in determining a possible path.

Figure 14:
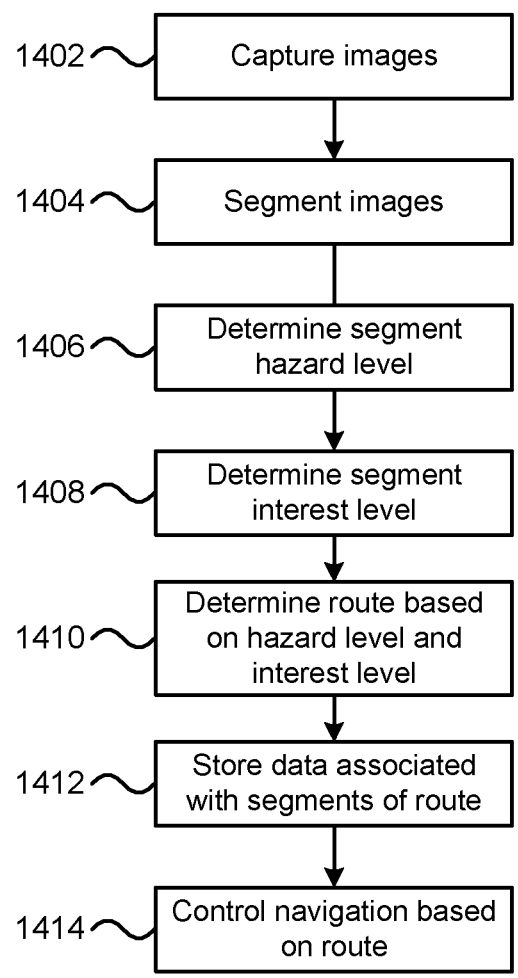
FIG. 14 depicts a method of navigating an autonomous or semi-autonomous vehicle based on interest levels of the terrain.

FIG. 14 depicts a method of navigating an autonomous or semi-autonomous vehicle based on interest levels of the terrain. The method 1400 begins with capturing images, which may be stereoscopic images, of the terrain (1402). The images may be segmented (1404) into segments. The image is processed to determine a segment hazard level (1406) as well as an interest level for the segments (1408). Once the hazard and interest levels are determined a route may be determined through the terrain based on the hazard levels and interest levels (1410). For example, the route may travel through 'safe' segments of the terrain in order to travel to one or more areas determined to be of high interest. Once the route is determined, the data associated with the segments along the route may be stored (1412) and the navigation of the vehicle controlled based on the determined route (1414).

Figure 15:
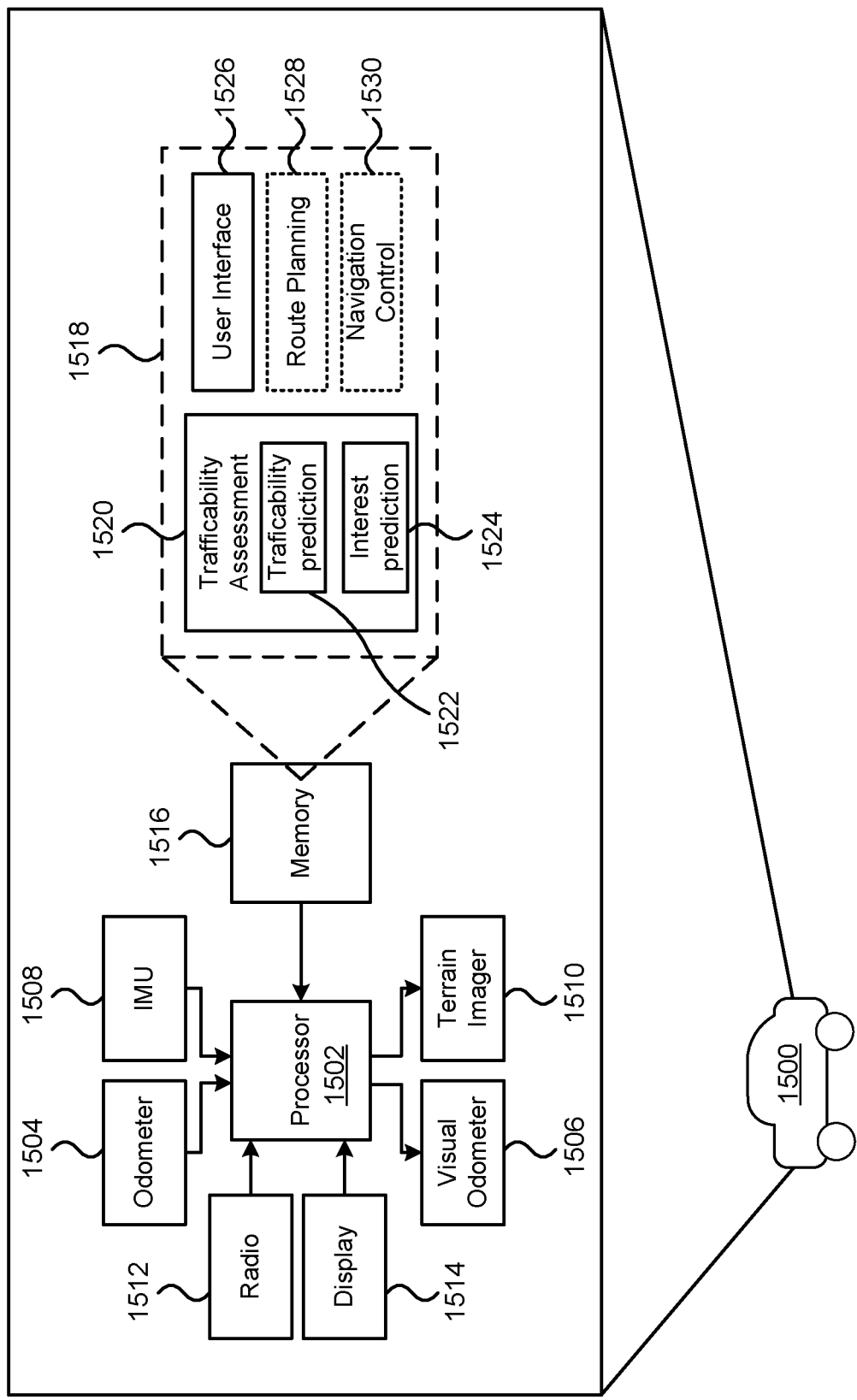
FIG. 15 depicts components of a vehicle with terrain trafficability assessment functionality.

FIG. 15 depicts components of a vehicle with terrain trafficability assessment functionality. The vehicle 1500 may be an autonomous vehicle, semi-autonomous vehicle, or a manually controlled vehicle. The vehicle 1500 comprises a processor 1502, which may include one or more processing units, processors, microprocessors, etc., that executes instructions that configure the vehicle to provide various functionality as described further below. The processor 1502 may be operatively coupled to a plurality of different components including, for example an odometer 1504 capable of tracking or determining an amount of distance covered by the vehicle. The odometer 1504 measures the movement of the wheel(s) or drivetrain and due to slipping may not provide the actual distance traveled. The vehicle 1500 further includes a visual odometer 1506 that is capable of determining an actual distance travelled by the vehicle. The visual odometer 1506 may comprise one or more cameras or imaging devices that allow the actual distance travelled to be determined by processing the captured images or data to identify common features in subsequently captured images and determine a distance between the common features in images. An inertial measurement unit (IMU) 1508 may provide information about the vehicle's orientation, rotational rates and linear accelerations. A terrain imager 1510 captures images of the terrain ahead of the vehicle, or in the direction the vehicle is attempting to travel. The terrain imager 1510 may comprise a pair of cameras providing stereoscopic images of the terrain. The vehicle may further comprise one or more communication radios 1512 for communicating with a remote system. Additionally, the vehicle may include a display 1514 and/or other user interface devices. The vehicle 1500 further comprises a memory 1516 for storing instructions, which when executed by the processor 1502, configure the vehicle to provide various functionality 1518.

The functionality 1518 may include trafficability assessment functionality 1520 for determining information about the terrain in the vicinity of the vehicle. The trafficability assessment functionality 1520 may include trafficability prediction functionality 1522 for determining hazard levels of terrain. Additionally, the trafficability assessment functionality 1520 is depicted as included interest prediction functionality 1524 for determining an interest level of the regions of the terrain. The functionality 1518 includes user interface functionality 1526 for creating a user interface for presenting to at least a portion of the information determined by the trafficability prediction functionality 1522 and the interest prediction functionality 1524. For example, the user interface may overlay the determined hazard levels and interest levels on the images of the terrain. Additionally or alternatively, the user interface may present graphical indications of the determined hazard levels and interest levels on a map of the region being traversed by the vehicle.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

Numerous additional variations on the methods and apparatus of the various embodiments described above will be apparent to those skilled in the art in view of the above description. Such variations are to be considered within the scope of the current description.

What is claimed is:

1. A method for use in navigating an autonomous or semi-autonomous vehicle, the method implemented by the vehicle and comprising:
   capture image data of at least one image of terrain ahead of the vehicle using a terrain imaging unit;
   determining a terrain class of a region of the terrain from the received image data;
   selecting a slip prediction model based on the determined terrain class, the slip prediction model selected from a plurality of trained slip prediction models;
   estimating a slope of the region of the terrain from the image data;
   predicting a slip amount based on the estimated slope using the selected trained slip model;
   applying a heuristic mapping to the predicted slip amount to provide a trafficability level, from a plurality of trafficability levels, for the region of the terrain;
   determining a vehicle route using the trafficability level; and
   controlling the autonomous or semi-autonomous vehicle according to the determined vehicle route.

2. The method of claim 1, further comprising:
   measuring an actual slip amount when traversing the region of the terrain;
   comparing the actual slip amount to the predicted slip amount; and
   when the actual slip amount differs from the predicted slip amount by a first anomalous threshold range, adjusting the heuristic mapping to account for the anomalous slip.

3. The method of claim 2, further comprising:
   when the actual slip amount differs from the predicted slip amount by a second anomalous threshold range greater than the first threshold range, halting navigation of the vehicle.

4. The method of claim 2, further comprising:
   flagging data comprising one or more captured images and measured slip and slope values;
   transmitting the flagged data to a remote control location for manual review;
   receiving update data from the remote control location in response to the transmitted flagged data; and
   updating one or more terrain classifiers and trained slip models.

5. The method of claim 2, further comprising:
   when the actual slip amount differs from the predicted slip amount by less than the first anomalous threshold range, determining if the actual slip amount should be used to update the selected trained slip prediction model; and
   when it is determined that the selected trained slip prediction model should be updated, updating the selected trained slip prediction model using the actual slip amount and a measured slope of the region of the terrain.

6. The method of claim 1, wherein the heuristic mapping applied to the predicted slip amount is associated with the determined terrain class of the region of terrain.

7. The method of claim 6, wherein the heuristic mapping maps predicted slip amounts to one of a plurality of predefined trafficability levels.

8. The method of claim 1, further comprising:
   operating in a training mode at a first location by capturing slip and slope experienced by the vehicle while traversing terrain of a known terrain type; and
   storing a model of the slip and slope in association with the known terrain type.

9. The method of claim 1, further comprising determining an interest level of one or more regions of the terrain from the image data for use in determining the vehicle route.

10. A non-transitory computer readable memory storing instructions which when executed provide a method for use in navigating an autonomous or semi-autonomous vehicle, the method comprising:

capturing image data of at least one image of terrain ahead of the vehicle using a terrain imaging unit;

determining a terrain class of a region of the terrain from the received image data;

selecting a slip prediction model based on the determined terrain class, the slip prediction model selected from a plurality of trained slip prediction models;

estimating a slope of the region of the terrain from the image data;

predicting a slip amount based on the estimated slope using the selected trained slip model;

applying a heuristic mapping to the predicted slip amount to provide a trafficability level, from a plurality of trafficability levels, for the region of the terrain;

determining a vehicle route using the trafficability level; and controlling the autonomous or semi-autonomous vehicle according to the determined vehicle route.

11. The non-transitory computer readable memory of claim 10, wherein the method further comprises:

measuring an actual slip amount when traversing the region of the terrain;

comparing the actual slip amount to the predicted slip amount; and when the actual slip amount differs from the predicted slip amount by a first anomalous threshold range, adjusting the heuristic mapping to account for the anomalous slip.

12. The non-transitory computer readable memory of claim 11, wherein the method further comprises:

when the actual slip amount differs from the predicted slip amount by a second anomalous threshold range greater than the first threshold range, halting navigation of the vehicle.

13. The non-transitory computer readable memory of claim 11, wherein the method further comprises:

flagging data comprising one or more captured images and measured slip and slope values;

transmitting the flagged data to a remote control location for manual review;

receiving update data from the remote control location in response to the transmitted flagged data; and updating one or more terrain classifiers and trained slip models.

14. The non-transitory computer readable memory of claim 11, wherein the method further comprises:

when the actual slip amount differs from the predicted slip amount by less than the first anomalous threshold range, determining if the actual slip amount should be used to update the selected trained slip prediction model; and when it is determined that the selected trained slip prediction model should be updated, updating the selected trained slip prediction model using the actual slip amount and a measured slope of the region of the terrain.

15. The non-transitory computer readable memory of claim 10, wherein the heuristic mapping applied to the predicted slip amount is associated with the determined terrain class of the region of terrain.

16. The non-transitory computer readable memory of claim 15, wherein the heuristic mapping maps predicted slip amounts to one of a plurality of predefined trafficability levels.

17. The non-transitory computer readable memory of claim 10, wherein the method further comprises:

operating in a training mode at a first location by capturing slip and slope experienced by the vehicle while traversing terrain of a known terrain type; and storing a model of the slip and slope in association with the known terrain type.

18. The non-transitory computer readable memory of claim 10, further comprising determining an interest level of one or more regions of the terrain from the image data for use in determining the route of the vehicle.

19. An autonomous or semi-autonomous vehicle comprising:

a terrain imaging unit for capturing images of terrain ahead of the vehicle;

a processing unit for executing instructions; and a memory storing instructions, which when executed by the processing unit configure the vehicle to:

capture image data of at least one image of terrain ahead of the vehicle using the terrain imaging unit;

determine a terrain class of a region of the terrain from the received image data;

select a slip prediction model based on the determined terrain class, the slip prediction model selected from a plurality of trained slip prediction models;

estimate a slope of the region of the terrain from the image data;

predict a slip amount based on the estimated slope using the selected trained slip model;

apply a heuristic mapping to the predicted slip amount to provide a trafficability level, from a plurality of trafficability levels, for the region of the terrain;

determining a vehicle route using the trafficability level; and controlling the autonomous or semi-autonomous vehicle according to the determined vehicle route.

20. The autonomous or semi-autonomous vehicle of claim 19, wherein the instructions stored in memory, which when executed, further configure the vehicle to:

measure an actual slip amount when traversing the region of the terrain;

compare the actual slip amount to the predicted slip amount; and when the actual slip amount differs from the predicted slip amount by a first anomalous threshold range, adjust the heuristic mapping to account for the anomalous slip.

* * * * *